United States Patent
Woodruff et al.

(10) Patent No.: US 11,242,844 B2
(45) Date of Patent: Feb. 8, 2022

(54) FIBER-FED ADVANCED PULSED PLASMA THRUSTER (FPPT)

(71) Applicant: CU Aerospace, LLC, Champaign, IL (US)

(72) Inventors: Curtis Woodruff, Savoy, IL (US);
Darren King, Champaign, IL (US);
Rodney Burton, Champaign, IL (US);
David L. Carroll, Champaign, IL (US)

(73) Assignee: CU Aerospace, LLC, Champagne, IL (US)

( * ) Notice: Subject to any disclaimer, the term of this patent is extended or adjusted under 35 U.S.C. 154(b) by 405 days.

(21) Appl. No.: 16/439,755

(22) Filed: Jun. 13, 2019

(65) Prior Publication Data

US 2020/0032777 A1 Jan. 30, 2020

Related U.S. Application Data

(63) Continuation-in-part of application No. 16/436,149, filed on Jun. 10, 2019, now Pat. No. 10,570,892.
(Continued)

(51) Int. Cl.
*F03H 1/00* (2006.01)
*B64G 1/40* (2006.01)
(Continued)

(52) U.S. Cl.
CPC ......... *F03H 1/0087* (2013.01); *F03H 1/0012* (2013.01); *B64G 1/405* (2013.01);
(Continued)

(58) Field of Classification Search
CPC .... F03H 1/0012; F03H 1/0081; F03H 1/0087; F03H 1/0093; B64G 1/406; H05H 1/48
See application file for complete search history.

(56) References Cited

U.S. PATENT DOCUMENTS

| | | |
|---|---|---|
| 3,159,966 A | 12/1964 | Curtis |
| 3,603,089 A | 9/1971 | Esker et al. |

(Continued)

FOREIGN PATENT DOCUMENTS

| | | |
|---|---|---|
| CN | 103134391 | 6/2013 |
| CN | 108005869 | 5/2018 |

OTHER PUBLICATIONS

CU Aerospace, LLC, Fiber Fed Advanced Pulsed Plasma Thruster (APPT), NASA SBIR Online Abstract, Apr. 19, 2017 : https://sbir.nasa.gov/SBIR/abstracts/17/sbir/phase1/SBIR-17-1-Z8.01-9758.html.

(Continued)

*Primary Examiner* — Arun Goyal
*Assistant Examiner* — William L Breazeal
(74) *Attorney, Agent, or Firm* — Adam K. Sacharoff; Much Shelist, P.C.

(57) ABSTRACT

A Fiber-fed Pulsed Plasma Thruster (FPPT) utilizes a motor to feed PTFE fiber to its discharge region, enabling high PPT propellant throughput and variable exposed fuel area. A highly parallel ceramic capacitor bank lowers system specific mass. Impulse bits (I-bits) from 0.057-0.241 mN-s have been measured on a thrust stand with a specific impulse (Isp) of 900-2400 s, representing an enhancement from state-of-the-art PPT technology. A 1 U (10 cm×10 cm×10 cm, or 1 liter) volume FPPT thruster package will provide 2900-7700 N-s total impulse, enabling 0.6-1.6 km/s delta-V for a 5 kg CubeSat. A 1 U design variation with 590 g propellant enables as much as ~10,000 N-s and a delta-V of 2 km/s for a 5 kg CubeSat. Increasing the form factor to 2U increases propellant mass to 1.4 kg and delta-V to 10.7 km/s for an 8 kg CubeSat.

26 Claims, 35 Drawing Sheets
(31 of 35 Drawing Sheet(s) Filed in Color)

Related U.S. Application Data

(60) Provisional application No. 62/684,275, filed on Jun. 13, 2018.

(51) Int. Cl.
  *H05H 1/14* (2006.01)
  *H05H 1/54* (2006.01)

(52) U.S. Cl.
  CPC .......... *F03H 1/0031* (2013.01); *F03H 1/0043* (2013.01); *H05H 1/14* (2013.01); *H05H 1/54* (2013.01)

(56) References Cited

U.S. PATENT DOCUMENTS

| | | | |
|---|---|---|---|
| 4,233,537 A | 11/1980 | Limpaecher | |
| 4,821,509 A | 4/1989 | Burton et al. | |
| 5,111,656 A | 5/1992 | Simon et al. | |
| 5,924,278 A | 7/1999 | Burton et al. | |
| 6,075,321 A | 6/2000 | Hruby | |
| 6,216,445 B1 | 4/2001 | Byers et al. | |
| 6,300,720 B1 | 10/2001 | Birx | |
| 6,318,069 B1 | 11/2001 | Falce et al. | |
| 6,336,318 B1 | 1/2002 | Falce et al. | |
| 6,373,023 B1 * | 4/2002 | Hoskins | H05H 1/54 219/121.52 |
| 6,378,290 B1 | 4/2002 | Killinger et al. | |
| 6,449,941 B1 | 9/2002 | Warboys et al. | |
| 7,530,219 B1 | 5/2009 | Burton et al. | |
| 7,926,257 B1 | 4/2011 | Burton et al. | |
| 7,926,258 B1 | 4/2011 | Burton et al. | |
| 10,047,731 B2 | 8/2018 | Deshpande et al. | |
| 10,176,930 B2 | 1/2019 | Eidelman et al. | |
| 2017/0211554 A1 * | 7/2017 | Childress | B64G 1/402 |
| 2017/0370353 A1 * | 12/2017 | Keidar | F03H 1/0012 |

OTHER PUBLICATIONS

CU Aerospace, LLC, Fiber-fed Advanced Pulsed Plasma Thruster (FPPT), NASA SBIR Online Abstract, Mar. 4, 2018 : https://sbir.nasa.gov/SBIR/abstracts/17/sbir/phase1/SBIR-17-2-Z8.01-9758.html.
PCT Search Report, dated Oct. 11, 2019, PCT/US2019/036927, CU Aerospace, LLC—Applicant.
Translation CN103134391, European Patent Office online translation retrieved Oct. 11, 2019.
Translation CN108005869, European Patent Office online translation retrieved Oct. 11, 2019.

* cited by examiner

Unison Igniter      CUA Regenerative Carbon Igniter (RCI)

| Region | Description |
|---|---|
| $0 < \Omega e < 1$ | High pressure, low B field, low ionization, electron current dominates |
| $\Omega e \sim 1$ | Medium pressure. medium B field, both ion and electron current |
| $\Omega e > 1$ | Low pressure, high B field, high ion current, low electron current |
| $\Omega e \gg 1$ | Lowest pressure, highest B field, high ionization, ion current dominates |

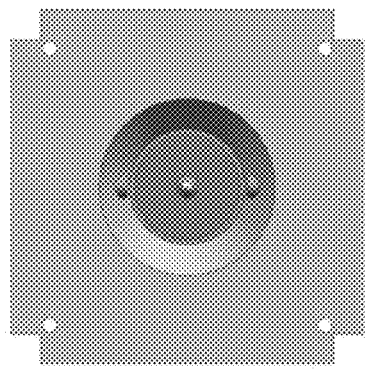 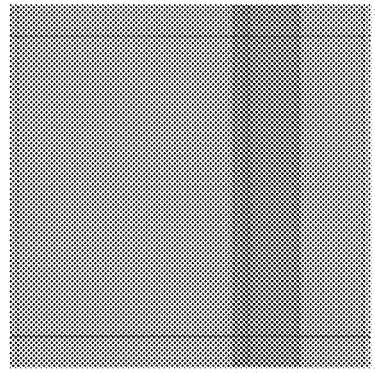 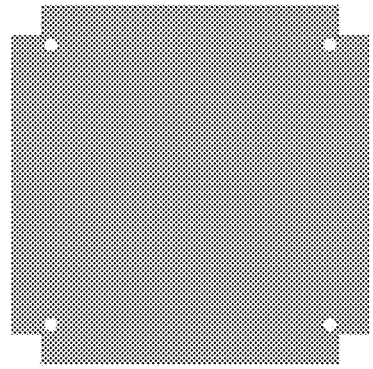
FIG. 26A          FIG. 26B          FIG. 26C
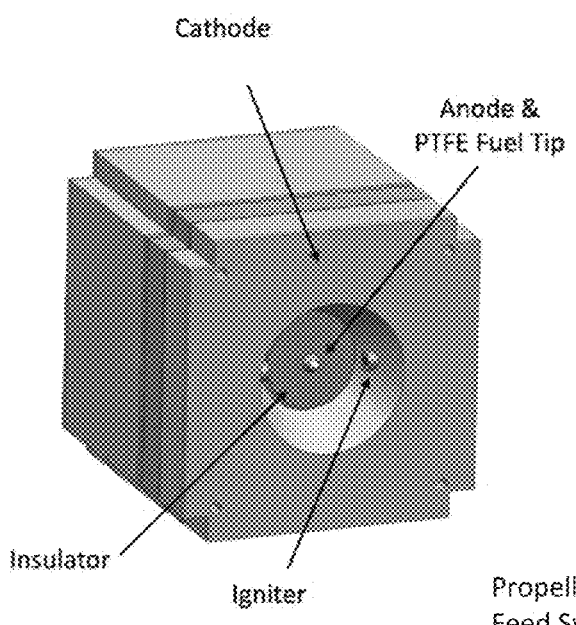 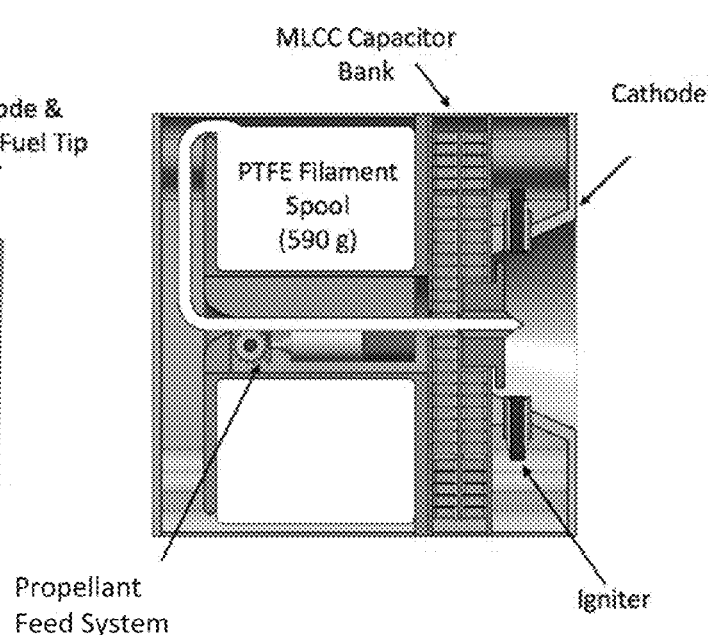
FIG. 27A          FIG. 27B

FIBER-FED ADVANCED PULSED PLASMA THRUSTER (FPPT)

CROSS-REFERENCE TO RELATED APPLICATIONS

The present invention in a Continuation in Part of U.S. application Ser. No. 16/436,149 filed Jun. 10, 2019, which claims priority to U.S. Provisional Application 62/684,275 filed Jun. 13, 2018, both of which are hereby incorporated in their entirety by reference.

STATEMENT OF GOVERNMENT SUPPORT

This invention was made with government support under NNX17CP36P and 80NSSC18C0063 awarded by NASA. The Government has certain rights in the invention.

BACKGROUND OF THE INVENTION

While classic pulsed plasma thruster (hereinafter "PPT") propulsion system technology is mature, it has historically been limited by its high mass and small propellant load to precision pointing and small delta-V applications. The PPT has a technology readiness level (TRL) of 9, having flown on several spacecraft beginning with the Soviet Zond 2 mission in 1964, accumulating over 30 thruster years in space through 1991. The LES 8/9 PPT was not flown but demonstrated $34 \times 10^6$ pulses during development and flight qualification. More recently (2000-2017), the PPT was employed for pitch control on the Earth Observing 1 (EO-1) spacecraft. The principal use of these PPTs has been for attitude control and precision orbital adjustments including stationkeeping, but not for primary propulsion applications such as orbit change and de-orbiting. Extensive flight experience demonstrates that technical risk areas such as pulse electromagnetic interference, exhaust condensation and system life have been successfully mitigated, supporting a TRL 9 rating.

An attempt at higher impulse PPT applications was an Air Force Rocket Propulsion Laboratory/Fairchild Industries program, which concluded in 1977; this project was devoted to developing the PPT for stationkeeping of 500 kg-class satellites, producing a one-millipound (4.4 mN) PPT with an impulse capability of 166,000 N-s from 10.6 kg of PTFE (Teflon™) propellant. The twin rectangular propellant bars were stored as opposed helices, and the pillbox-shaped thruster envelope had a volume of ~85 liters, with a total system mass, including 10 kg of high voltage capacitors, of 24 kg. The self-field $\vec{j} \times \vec{B}$ device generated thrust between plane parallel electrodes through a side exhaust nozzle from 450 J pulses at 0.20 Hz, at a mean thruster power of 90 W. System specific mass was $\alpha=210$ kg/kW. The PPU mass was 2.4 kg, and the PPU specific mass was high at ~15 kg/kW. A question remains as to the accuracy of the specific impulse, as $I_{sp}$ was claimed as 2200 seconds, and did not include eroded electrode mass in the calculation. The one-millipound thruster demonstrated that the Teflon PPT can generate very high total impulse, with a volumetric impulse of 2700 N-s/liter, but did not demonstrate low specific mass [kg/kW].

Historically, pulsed plasma systems have targeted small delta-V applications such as attitude control. With Applicant's Fiber-fed Pulsed Plasma Thruster (hereinafter "FPPT") and its innovative propellant feed and storage system, FPPT is projected to outperform previous state of the act PPT systems, as well as newer technologies. With an anticipated >5,000 N-s total impulse from a 1 U system, and a 1 U mass of <1.5 kg, 100 s of km orbit transfers and inclination changes of tens of degrees are now available to smaller satellites. The intrinsic safety of FPPT and its inert, unpressurized PTFE propellant position it as a prime candidate for secondary payload missions where costs and logistics are dominated by range safety concerns. The solid propellant has no handling, storage, or operational restrictions. The ease of handling and storage for the solid propellant can extend operation to planetary missions with no additional monitoring or controls. FPPT system unit costs are anticipated to be significantly below competing liquid or gas-fed CubeSat propulsion systems.

Specific goals stated in NASA's 2015 Roadmap In-Space Propulsion Technologies Technical Areas 2.1.1, Chemical Propulsion, and 2.1.7, Micropropulsion, are "Enhance current missions and open up new mission opportunities through improvements in performance, manufacturability, durability, and cost", "Develop engines that operate on non-toxic storable propellants", and "Develop compact and lightweight systems with high precision control capability." Applicant's FPPT propulsion system responds directly to these goals with a focus on high total impulse performance with cost reduction through common commercial-off-the-shelf (COTS) materials of construction.

Commercial interest in very small satellites continues to grow in the 1-500 kg satellite sector. Moving forward, it is more important than ever that these satellites have access to propulsion systems to extend their asset time on orbit. The FPPT system offers CubeSats and larger small satellites a significant propulsion capability with high impulse per unit volume. The Teflon propellant has no handling, storage, and operational restrictions. FPPT will require no safety equipment for storage, transportation, integration, and testing, and place no demanding requirements on the launch provider, making it an ideal low-cost solution for industry, research, and academic small-satellite propulsion needs.

Potential CubeSat and nanosatellites missions with FPPT include low Earth orbit raising and/or deorbiting. FPPT would improve mission affordability for multiple CubeSats, since several CubeSats with FPPT could be launched from a single low-cost booster and maneuvered to other orbits, then later de-orbited. The FPPT thruster will provide a compact, low mass, non-hazardous propulsion technology solution that will be made available in a family of sizes by changing the propellant spool volume to meet the differing needs of users in NASA, DOD, industry, and universities for CubeSat and small-satellite missions.

SUMMARY OF THE INVENTION

While classic PPT technology is mature, it has historically been limited by its size and propellant load, for example Applicant's prior PPT-11 technology, FIG. 1 [as shown and patented in Applicant's U.S. Pat. Nos. 7,530,219 B1, 7,296, 257, and 7,926,258—Thruster 10]. Technology advances in the past 20 years can now be applied to the Teflon™ PPT to create the innovative FPPT, making several significant improvements to the classic PPT technologies.

The present invention is directed to a Fiber-fed Pulsed Plasma Thruster (FPPT). The thruster replaces the spring-fed state of the art Teflon™ feed system with a motor-driven fiber feed system, which pulls a flexible Teflon fiber from a spool. Additionally, an innovative, highly parallel ceramic capacitor bank dramatically lowers system specific mass. As used herein the fiber propellant can be a Teflon™ or PTFE equivalent.

The Fiber-fed Pulsed Plasma Thruster (FPPT) will enable low orbit, cis-lunar and deep space missions for small satellites. FPPT technology utilizes a motor to feed PTFE fiber to its discharge region, enabling class-leading PPT propellant throughput and variable exposed fuel area. An innovative, highly parallel ceramic capacitor bank dramatically lowers system specific mass. FPPT is inherently safe; its non-pressurized, non-toxic, inert propellant and construction materials minimize range safety concerns. Estimates are that a 1-liter (10 cm×10 cm×10 cm, or 1 U) volume FPPT thruster package may provide as much as 10,000 N-s total impulse, enabling 1.4 km/s delta-V for an 8 kg CubeSat. CU Aerospace (Applicant) is presently developing a 1 U integrated system including the advanced thruster head with igniter system, PTFE fiber feed system, power processing unit, and control electronics.

Numerous other advantages and features of the invention will become readily apparent from the following detailed description of the invention and the embodiments thereof, from the claims, and from the accompanying drawings.

BRIEF DESCRIPTION OF THE FIGURES

The patent or application file contains at least one drawing executed in color. Copies of this patent or patent application publication with color drawing(s) will be provided by the Office upon request and payment of the necessary fee. A fuller understanding of the foregoing may be had by reference to the accompanying drawings, wherein:

FIGS. 26A, 26B and 26C are views of an FPPT system in a 1 U volume envelope (front, side, and back views);

FIGS. 27A and 27B are 3D perspective and cutaway views of an FPPT system in a 1 U volume envelope having sufficient PTFE propellant to achieve >10,000 N-s of total impulse with the unified electronics board (PPU+motor driver) designed to fit in the annular region between the cathode and the capacitor bank.

DETAILED DESCRIPTION OF THE INVENTION

Figure 2A:
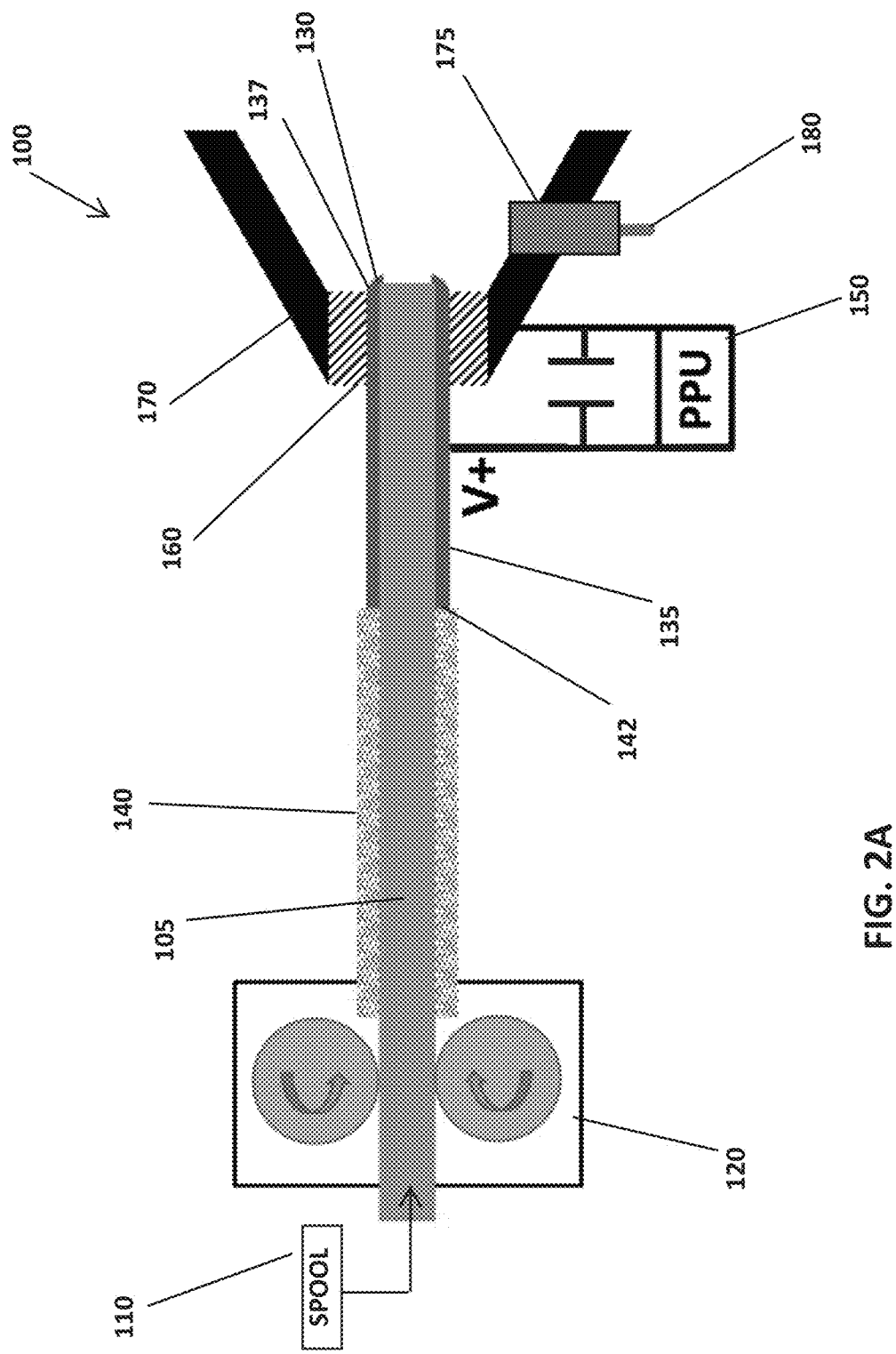
FIG. 2A is a representation of an Embodiment of an FPPT concept schematic.
Figure 2B:
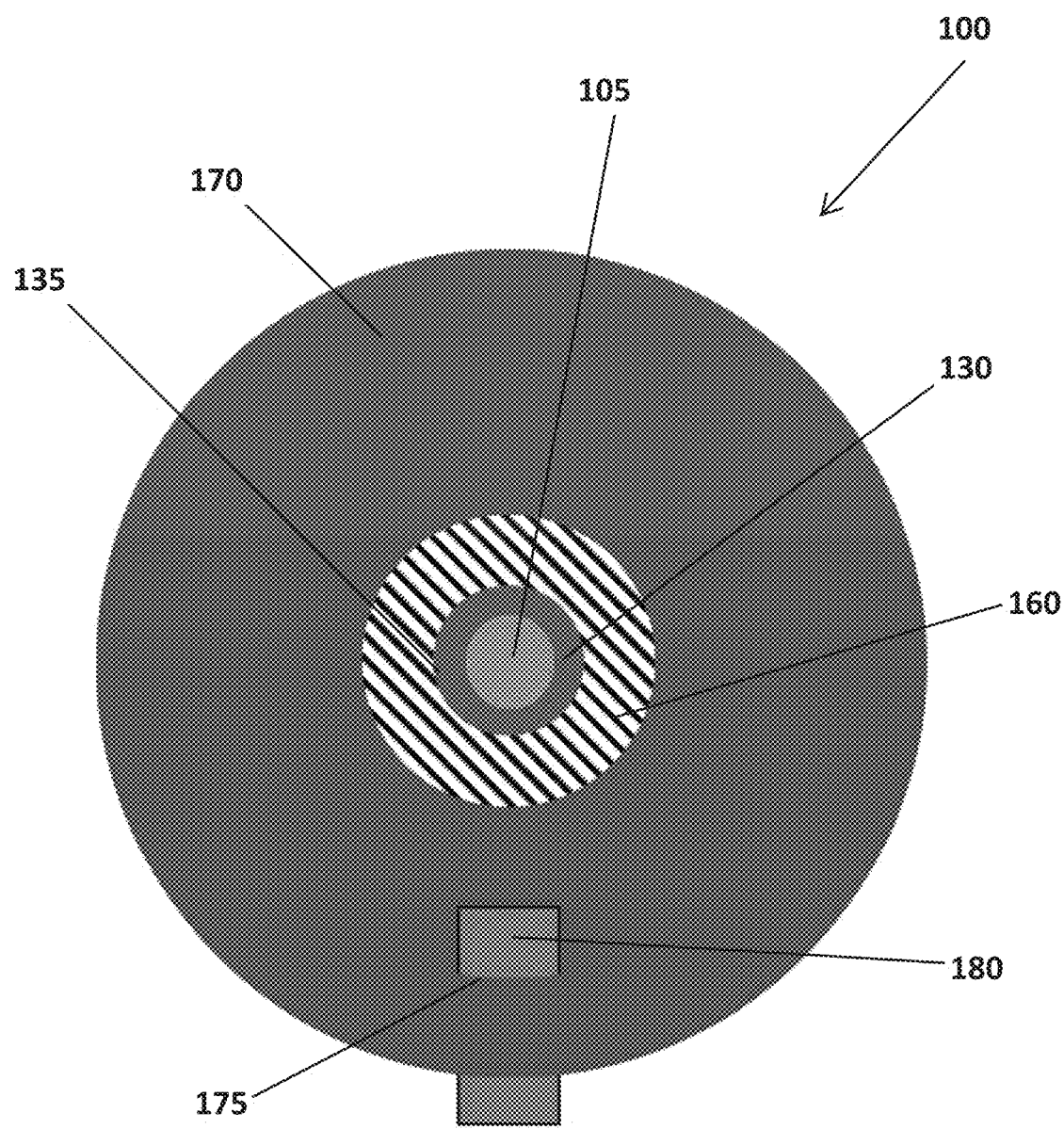
FIG. 2B is a front representation of the embodiment from FIG. 2A.

A schematic of one embodiment of Applicant's Fiber-fed Pulsed Plasma Thruster (FPPT) generally referenced as element 100 is shown in FIGS. 2A and 2B. The thruster 100 replaces the spring-fed state of the art Teflon feed system with a fiber feed system, which pulls a Teflon fiber 105 from a spool 110. Prior Art PPT feed systems use a spring to push a propellant bar against a stop without ablation rate control, and this embodiment of the FPPT employs a pulsed stepper motor 120 to drive the fiber 105 against a stop 130 at the tip of a centered anode 135. This system retains a fixed anode/propellant geometry as propellant is consumed. Because of the feed stop 130, it may be necessary to incorporate a slip clutch in the drive mechanism, or to monitor step motor current for a stall. A stall condition will initiate a pause in the feed command, followed by a resumption in feed after an empirically-determined number of pulses.

In greater detail of FIGS. 2A and 2B, the Teflon fiber 105 is wound on a spool 110. The feed motor 120 (stepper or other motor) drives or pulls the fiber 105 from the spool 110 into an insulated feed tube 140. The fiber 105 is fed through the feed tube 140 into the tubular centered anode 135. The centered anode 135 is cylindrically shaped and configured against an end 142 of the feed tube 140 to ensure the fiber 105 properly feeds through the anode 135. The anode 135 is electrically connected to a power processing unit ("PPU") 150. The exit end or tip 137 of the anode 135 includes the stop 130, which may be configured as a radially inward flange. An insulator 160 is positioned near the stop 130 and insulates the anode 135 from a cathode 170. The insulator 160 may contain circumferential labyrinthal grooves in the outer diameter so as to trap solid carbon particles from the dissociated PTFE and prevent surface flashover along the exposed faces of the insulator 160 between the anode and cathode during capacitor charging and before the igniter is fired. The cathode 170 may be connected to the PPU 150, either by direct connection or through a high ohmic value standoff resistor. The cathode 170 also may have a preferred shape as a divergent nozzle. Lastly, an igniter 180 is fitted through an opening 175 in the cathode, and may be directly connected to the cathode, or may be connected to the cathode through a resistive or inductive standoff impedance.

In operation, the motor pulls fiber fuel from the spool and feeds it through the feed tube into the anode. The fiber fuel will be fed to the end of the anode at the stop 130. When the igniter pulse is triggered it expels electrons into nozzle region which are attracted to the positively charged anode, consequently triggering the primary high energy discharge to ignite between the anode 137 and cathode 170, thereby creating a radiative plasma that heats and vaporizes the surface of the fiber propellant, allowing the discharge to create a dissociated and partially ionized plasma that will be electromagnetically and electrothermally accelerated outward from the nozzle to produce thrust. As the exposed surface of the fiber fuel ablates away, the motor is controlled to feed more fiber to the stop 130.

Figure 1:
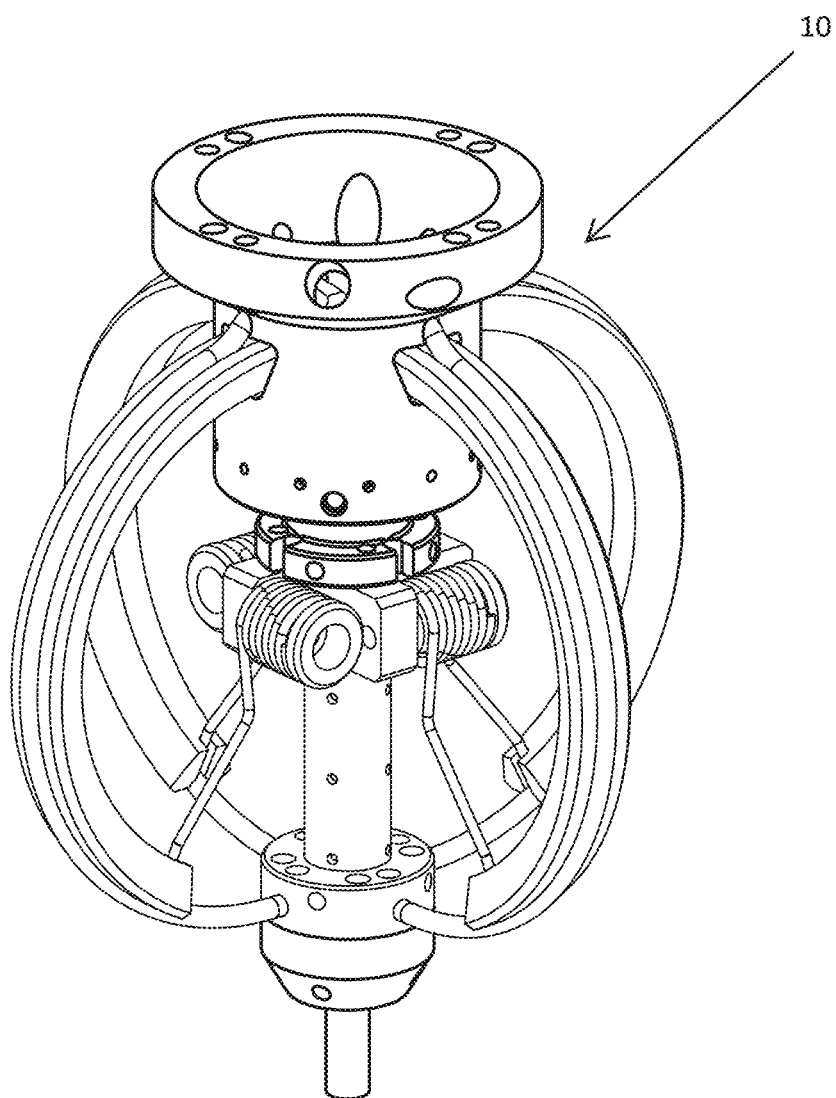
FIG. 1 is a Prior Art photograph of Applicant's PPT-11 coaxial pulsed plasma thruster having Isp ~1200 s, specific thruster dry mass >100 kg/kW, and relatively low propellant storage mass of 54 grams.

While classic PPT technology is mature, it has historically been limited by its size and propellant load, for example Applicant's prior PPT-11 technology, FIG. 1 [U.S. Pat. Nos. 7,530,219 B1, 7,296,257, and 7,926,258]. Technology advances in the past 20 years can now be applied to the Teflon™ PPT to create the innovative FPPT, making several significant improvements to the classic PPT technologies:

Coaxial Geometry.

A high $I_{sp}$ thruster using a cathode design similar to the PPT-11 thruster, FIG. 1, but incorporating a motor-driven fiber-fed feed system that feeds Teflon fiber through the anode to achieve high throughput, FIGS. 2A and 2B. The coaxial PPT-11, generated 1.7 mN at 1200 s $I_{sp}$, using an axisymmetric discharge with a conical nozzle cathode and central anode, with the propellant fed radially through the cathode. The coaxial geometry collapses the discharge volume and raises the plasma conductivity and thruster efficiency. The thrust is generated 65-75% electromagnetically from $\vec{j} \times \vec{B}$ (high $I_{sp}$), with the remainder being generated electrothermally (lower $I_{sp}$). The cathode locates the igniter plug that sprays electrons toward the central anode to initiate the discharge at a rate of 1-20 pulses per second. Applicant has now demonstrated performance similar to the PPT-11 with the FPPT, reaching 87% electromagnetic (EM) thrust.

Fiber Feed System.

Figure 3:
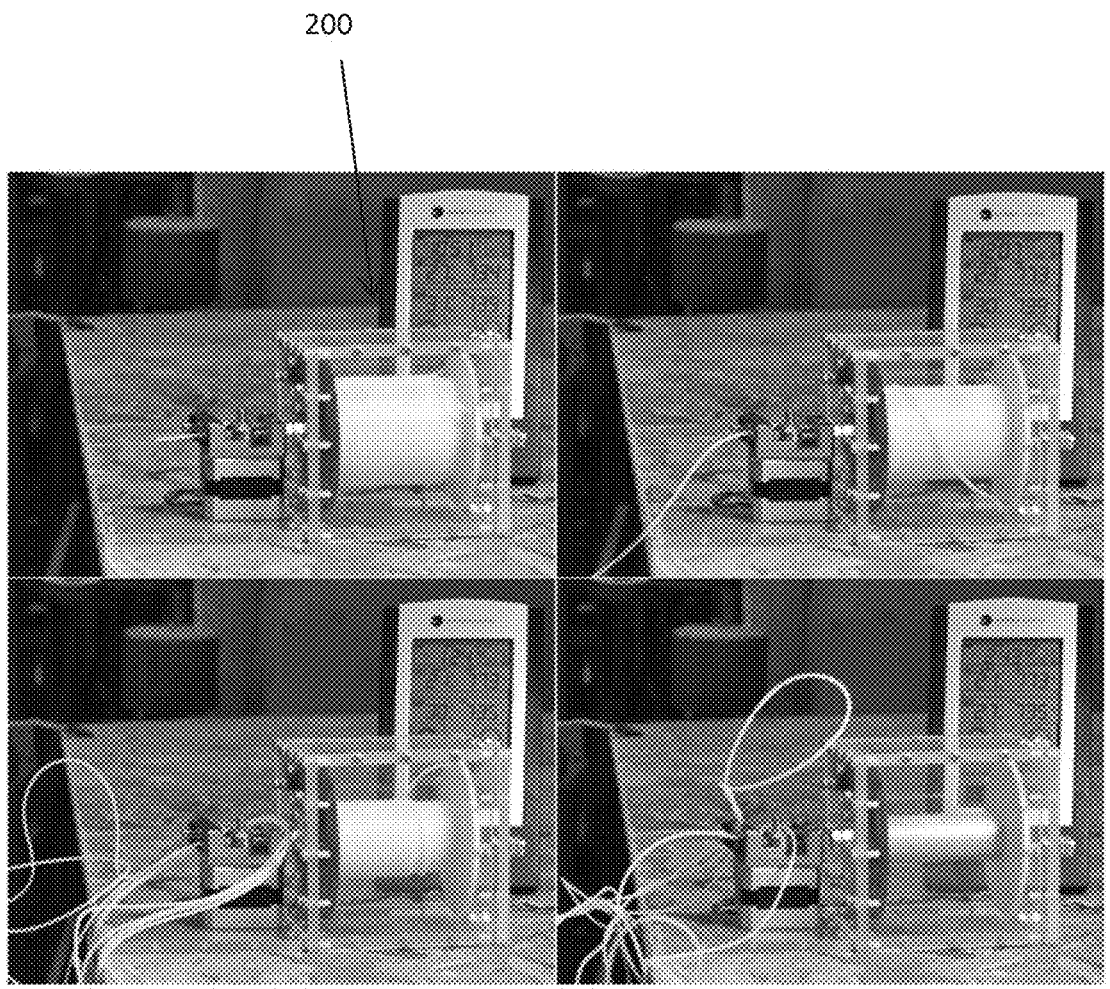
FIG. 3 is a Motor-driven feed system demonstrator and fiber propellant spool placed in a 1 U volume thruster system, showing in a sequence of photographs shows a spooled fiber with a fiber mass of 170 g in upper left to completely fed (emptied) spool in lower right.

The design of the PPT Teflon feed system has always been a challenge for high throughput PPTs, as observed with the large (85 liter) envelope for the AFRPL/Fairchild millipound (4.4 mN) thruster, and the small geometry-limited propellant mass for the coaxial PPT-11 (FIG. 2). Recent technology developments at Applicant have shown that a propellant fiber can be reliably fed from a high-capacity static spool using a motor-driven fiber feed system adapted from 3D printer technology, FIG. 3, Feed System 200. A commercial off-the shelf (COTS) stepper motor and drive setup (Anycubic MK8 Extruder) was used for testing, and a preliminary flight configuration was designed for implementation that matches its torque and feed rates. (Note that other motors can be used for FPPT.) The same COTS system was used for the FPPT PTFE fiber feed. For the coaxial FPPT, the fiber is fed through the center of the central anode. The packing factor for fiber on the spool system was measured at 90%, and with the PTFE density of 2.2 kg/liter, high propellant mass can be stored at higher density and lower mass than can competing gas and liquid propellants using tanks.

High Voltage Capacitors.

Improvements in capacitor technology, specifically the dielectric, have not significantly improved specific mass or volume, but have significantly lowered equivalent series resistance (ESR), with two major benefits: (1) low ESR increases pulse current, raising $\vec{j} \times \vec{B}$ and efficiency; (2) low ESR permits a reduction in capacitance and discharge energy, compensated by as much as an order-of-magnitude increase in pulse rate, with capacitor mass correspondingly reduced. Reductions in capacitor mass also reduce circuit inductance, raising current and also $\vec{j} \times \vec{B}$ thrust. A typical PPT-11 current pulse (FIG. 4) was 30 kA with half-period of 8 μs. PPT-11 used a bank of 4×20.5 μF, 1.7 kg, low ESR mica capacitors developed by Unison Industries. Multi-layer ceramic capacitors (MLCC), a more recent development, are a robust, low mass and low-volume option for primary energy storage.

Ignition System.

Prior PPT ignition was based on a fast pulse delivered to a semiconductor igniter plug developed for gas turbine ignition. Igniter circuit switching has improved from vacuum gaps to silicon-controlled rectifiers to MOSFETs, with the latter depending on the availability of higher voltage devices.

Power Processing Unit (PPU).

The PPU for the FPPT will supply a nominal 1 kV charging current source to the capacitors, a pulse to the igniter plug, and low voltage current to the feed system motor. High power electronics technology and higher voltage operation have allowed reductions in PPU specific mass, so that 3 kg/kW (3 g/W) at 94% efficiency was achieved in 2001. Modern PPU specific mass is estimated at <2 kg/kW; for example, Applicant's 40 W CHIPS PPU is just under 40 grams (1 kg/kW).

PPT Physics.

The time-dependent heating and sublimation of the Teflon surface during and after the pulse is now well understood and is used to predict pressure decay time in the interelectrode region. Experimental PPT measurements of Antonsen were in agreement with the plasma modeling of Keidar and Boyd. The combined effect of mixed $\vec{j} \times \vec{B}$ and electrothermal acceleration on PPT performance is now well understood using a two-fluid model as developed by Burton. Unlike all previous PPTs, preliminary analysis of the FPPT predicts operation in a $\vec{j} \times \vec{B}$ pinch mode near the central anode, resulting in regions of a zero value of electron Hall parameter and high ion current on-axis and high values of electron Hall parameter off-axis, with ion-neutral charge exchange an important aspect of the physics.

Figure 5:
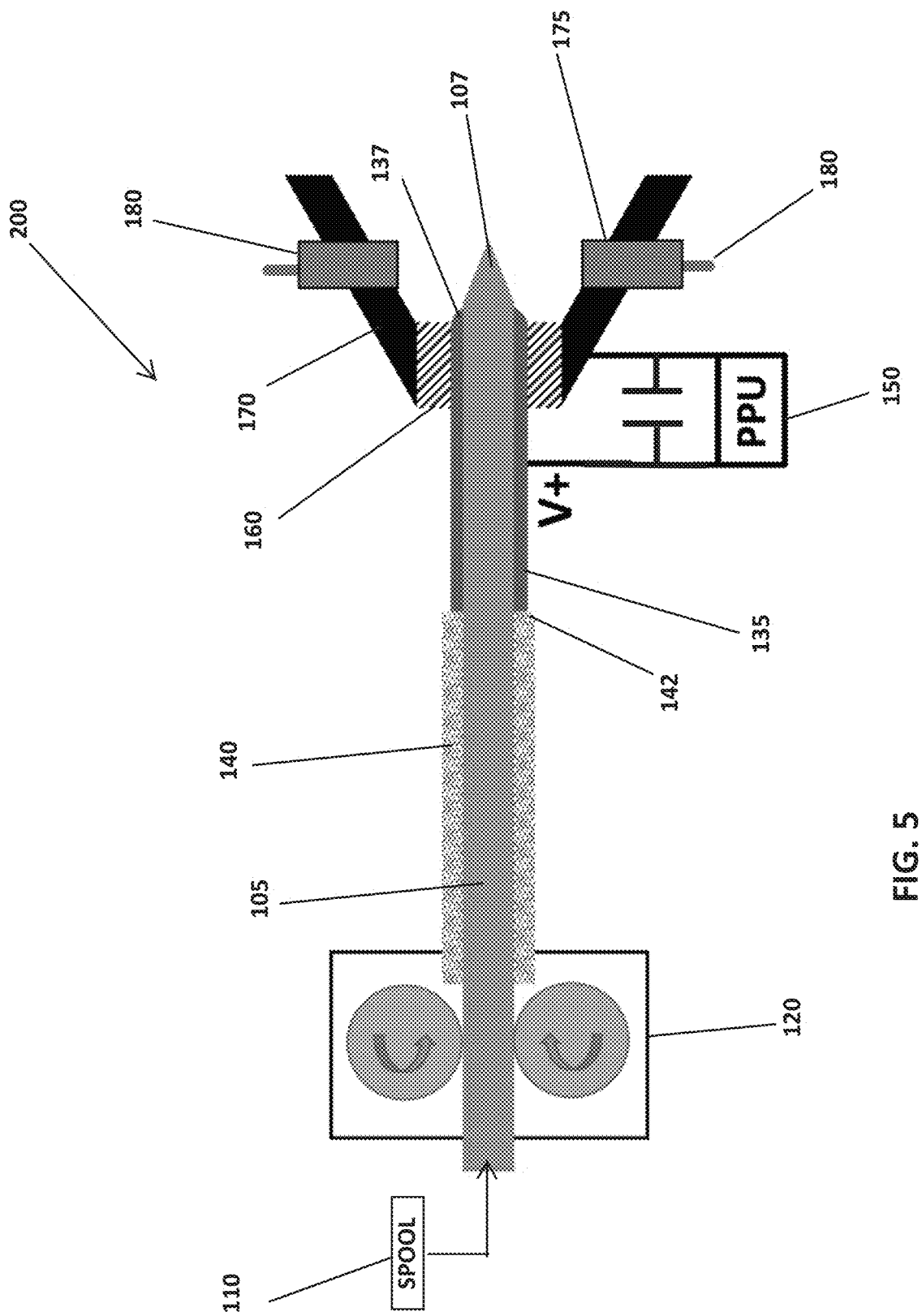
FIG. 5 is another embodiment of a FPPT concept schematic.

A schematic of another embodiment of the Applicant's concept for the Fiber-fed Pulsed Plasma Thruster (FPPT) is shown in FIG. 5. It was found that a feed stop lip on the end of the anode of the first embodiment (FIGS. 2A and 2B) was not required by FPPT as the motor-driven feed system could provide a reliable rate of feed without having the forced stop, in combination with a self-forming conical end tip on the propellant feed that is shaped by sublimation caused by the radiating plasma discharge (photographs shown later). It was also found that the conical height is a function of the feed rate, discussed in detail below. Removing the feed stop allowed performance flexibility by tuning from higher-Isp operation to higher-thrust operation depending on feed rate.

In greater detail of FIG. 5 and similar in components and referencing to the prior figures for similar elements, the Teflon fiber 105 is wound on a spool 110. The stepper motor 120 drives or pulls the fiber 105 from the spool 110 into an insulated feed tube 140. The fiber 105 is fed through the feed tube 140 into the centered anode 135. The centered anode 135 is cylindrically shaped and configured against an end 142 of the feed tube 140 to ensure the fiber 105 properly feeds through the anode 135. The anode 135 is electrically connected to a power processing unit ("PPU") 150. The exit end or tip 137 of the anode 135 does not include a stop (as shown previously). An insulator 160 is positioned near the exit end 137 and insulates the anode 135 from a cathode 170. The cathode 170 may be connected to the PPU 150. The cathode 170 also may have a preferred shape as a divergent nozzle. Lastly, one or more igniters 180 are fitted through openings 175 in the cathode.

In operation, the motor pulls fiber fuel from the spool and feeds it through the feed tube into the anode. The fiber fuel will be fed towards the end 137 of the anode. When an igniter is triggered, electrons are expelled into the nozzle region which consequently triggers the primary high energy discharge to break down between the anode 137 and cathode 170, thereby creating a plasma that vaporizes the surface of the fiber propellant, creating a partially ionized gas that will be ejected electromagnetically and electrothermally outward from the nozzle to produce thrust. While the surface of the fiber fuel vaporizes away, the motor feeds more fiber. As the fiber propellant burns a conical tip 107 is formed and thrust is created by accelerating the sublimated fiber propellant.

DETAILED DESCRIPTION OF THE INVENTION

Design and Fabrication of Breadboard FPPT

Design and Fabrication

Figure 6A:
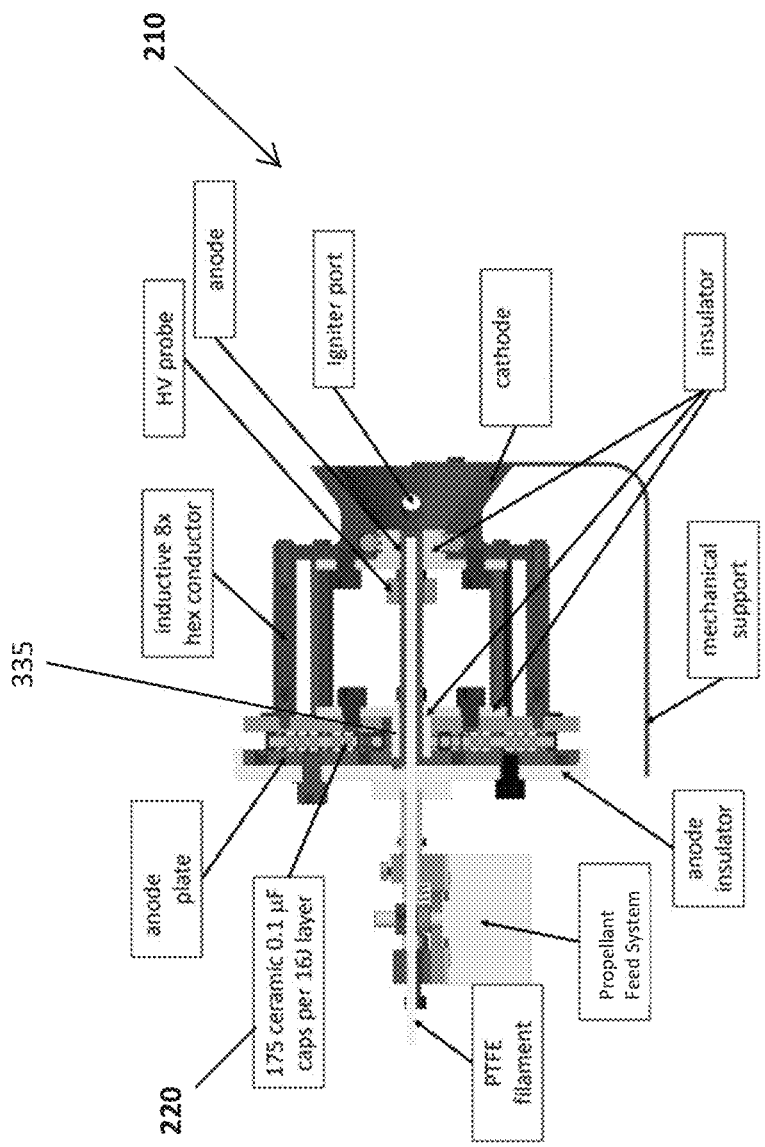
FIG. 6A is a side view of a FPPT breadboard design.
Figure 6B:
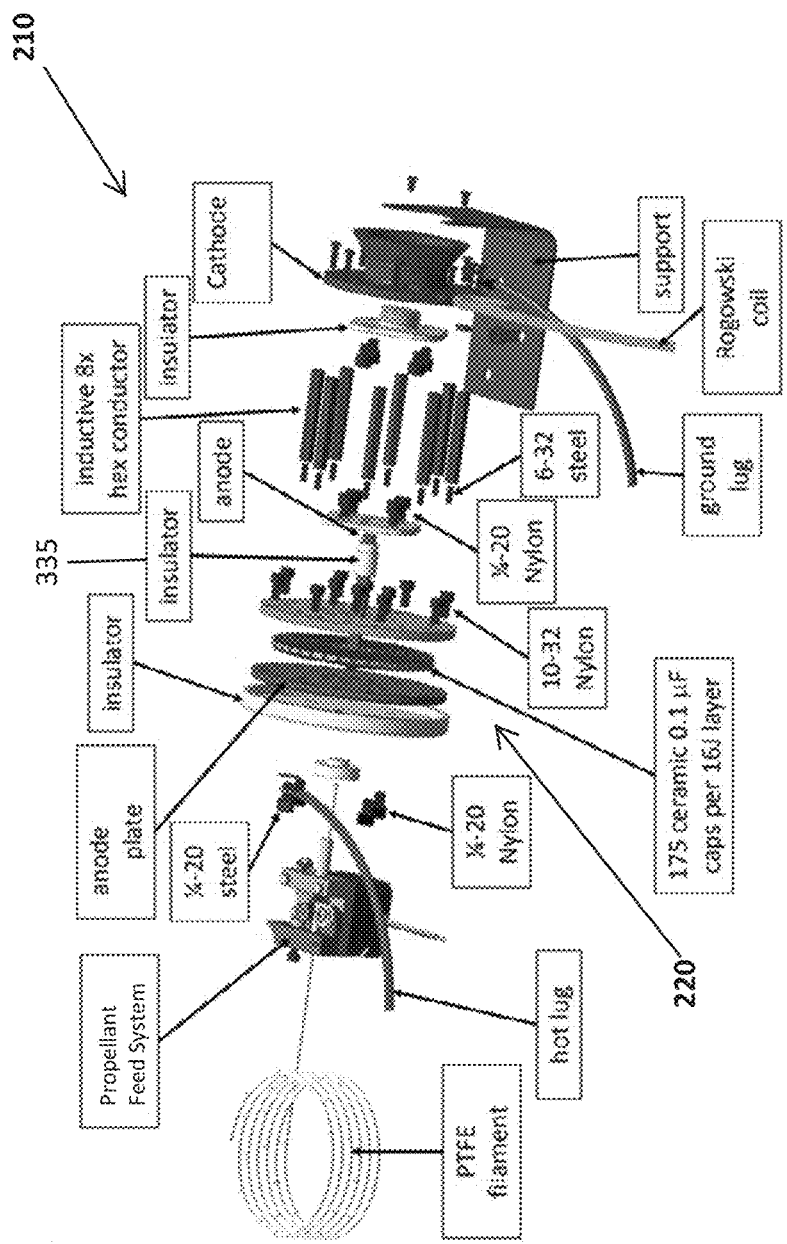
FIG. 6B is a perspective exploded view of the FPPT breadboard.
Figure 6C:
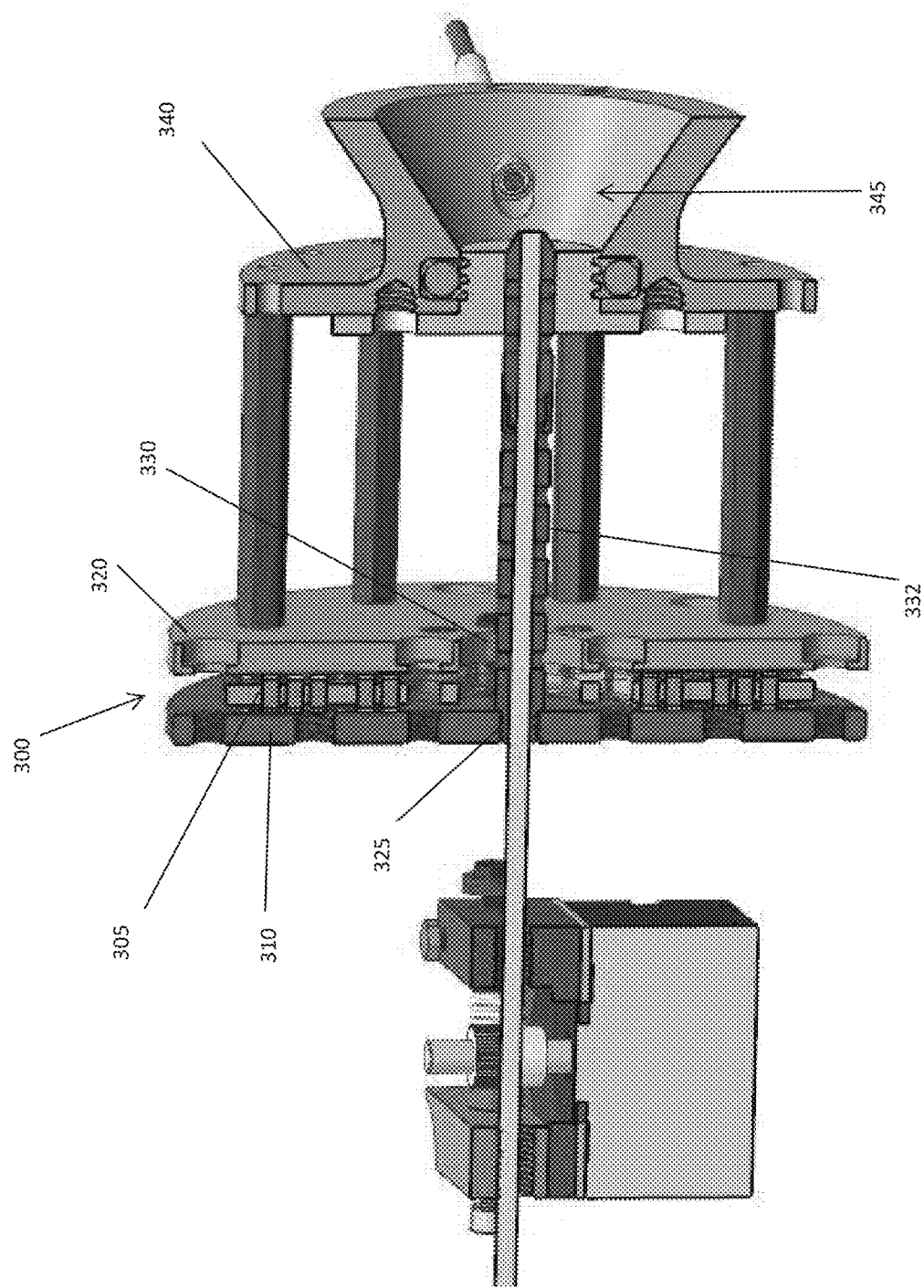
FIG. 6C is a cross section view of the FPPT breadboard.
Figure 7A:
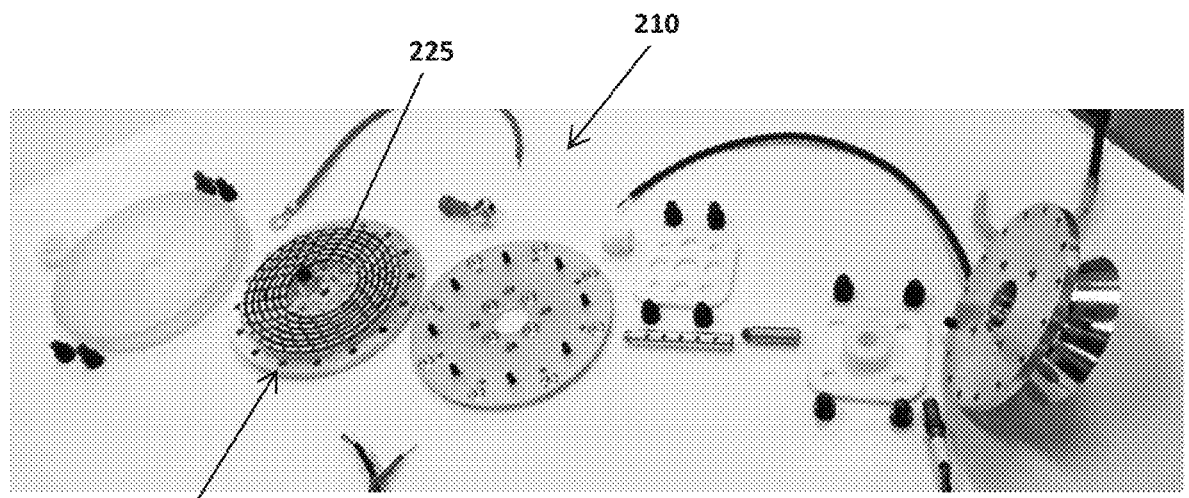
FIG. 7A is a photograph of the unassembled FPPT breadboard components (shown without propellant spool)
Figure 7B:
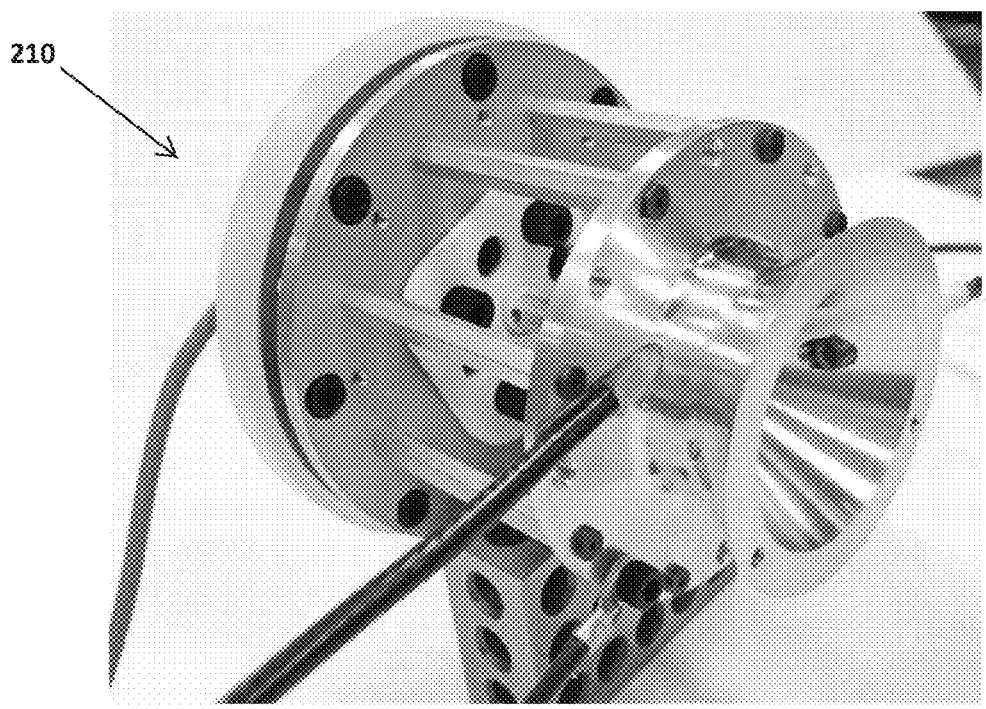
FIG. 7B is an assembled view of the FPPT breadboard propulsion system (shown with assembled capacitor bank at back of thruster, but without propellant spool)

A breadboard thruster 210 was designed, fabricated, and assembled. Key design features include an interchangeable anode with central fiber-feed tube, interchangeable igniters, and 16 Joules of ceramic capacitors 220 in an integrated low inductance configuration. FIG. 6A shows the labeled solid model, and FIGS. 6B and 6C shows an exploded view of the first breadboard design. FIG. 7A shows all the hardware laid out before assembly, and FIG. 7B shows the resulting first assembled breadboard thruster. A Rogowski coil, in conjunction with an RC integrator, provides a calibrated current trace easily readable with an oscilloscope.

Capacitor Bank Development

One FPPT breadboard thruster 210 utilized 175× VJ9363Y104KXGAT 2225-size ceramic multi-layer ceramic capacitors (MLCC) stacked vertically in circular rings 220, FIG. 7A. These capacitors are retained via compression, conductive adhesive, or solder, with anode and cathode plates contacting the capacitor terminations. Encapsulation or conformal coating can also be utilized to protect the capacitors.

Several different MLCC options were tested and this option performed most reliably in early trials. Note that other MLCC capacitors may be used. For a capacitance of 20 µF, 200 MLCCs will be required, which at 0.434 g apiece amounts to a total mass of only 87 g. A single 20.3 µF mica capacitor pack used for prior PPT-11 work by Applicant had a mass of 1535 g; the MLCC cap bank is only 5.6% of the mass of this prior technology, near-20-fold decrease. Note that the use of these MLCCs is one of the key implementations of modern electronics into our FPPT technology, reducing capacitor specific mass from $\alpha_{cap}$>200 kg/kW by approximately two orders of magnitude to ~2 kg/kW.

The MLCCs used in the first breadboard testing were 0.1 µF with a max voltage of 1000 V, giving a 175-cap bank maximum energy of Eo=8.8 J at 1000 V. To extend cap life, this bank was reduced to 800V (5.6 J) for the bulk of preliminary tests. The large quantity of small capacitors in parallel was chosen to minimize the ESR and inductance of the capacitor bank. The 175 MLCCs contained in the first breadboard unit shown in FIGS. 7A and 7B weigh only 76 g for 8.8 J, or $\alpha_{cap}$=1.7 kg/kW at 5 Hz. Overall, this dramatic reduction in capacitor bank mass will result in a decrease in the overall thruster specific mass $\alpha_{system}$ to <15 kg/kW. The first FPPT assembly shown in FIG. 7B was not optimized with a mass of ~650 g. Future flight designs will have significantly lower mass.

Figure 8:
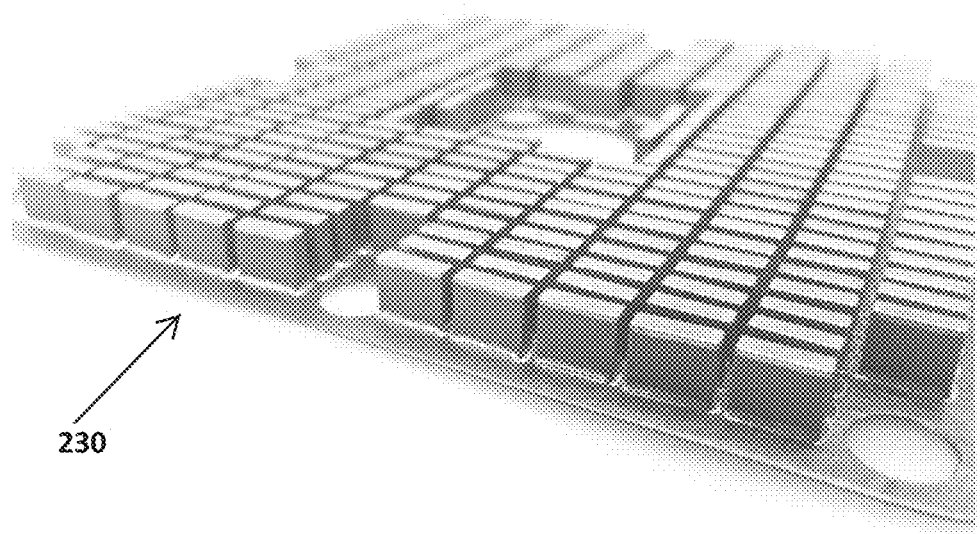
FIG. 8 is a half-assembled MLCC bank with a square footprint.
Figure 9:
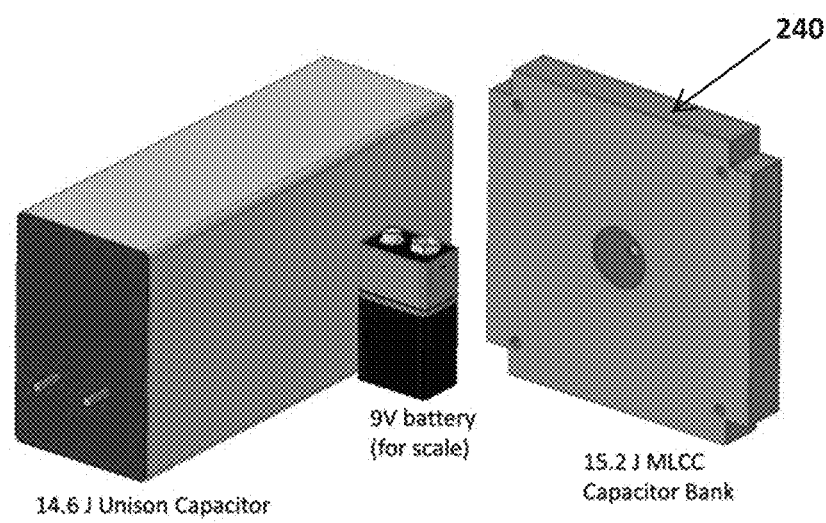
FIG. 9 is an illustration of a multi-layer ceramic capacitor (MLCC) two-layer configuration that provides the same energy storage as 20-year old Unison Mica Capacitor technology in a compact package having ~18% of the mass.

While the breadboard MLCC capacitor module had a similar capacitance to the Unison mica capacitor, the higher voltage capabilities of the mica caps enabled higher total energy. As this higher energy storage was also desired for FPPT, a more scalable square pattern capacitor module arrangement using the MLCCs was developed and fabricated, conforming well to the 1 U CubeSat form factor. Each square module of MLCCs provides up to 10 J. FIG. 8 is a photograph of a partially assembled single layer module 230 containing 33 µF of 1000 V capacitors with a pulse energy of 7.6 J at an operating point of 800 V. A two-layer module design 240 holds 66 µF of 1000 V capacitors for a pulse energy of 15.2 J at an operating point of 800 V, FIG. 9. Note that Applicant operates the 1000 V capacitors at a de-rated 800 V to ensure the required lifetime of the capacitors. At 15.2 J and 259 g, this two-layer module exceeds the energy storage capabilities of the 20-year old Unison technology with 82% less mass; note that the use of these MLCCs is one of the key implementations of modern electronics into our FPPT technology, enabling a 10× reduction in overall specific mass. Four modules (total 33 J capacity) can provide higher performance, as discussed below, and more than four modules are easily added with the trade-off of higher cost and mass, and possibly reduced propellant mass.

Figure 10A:
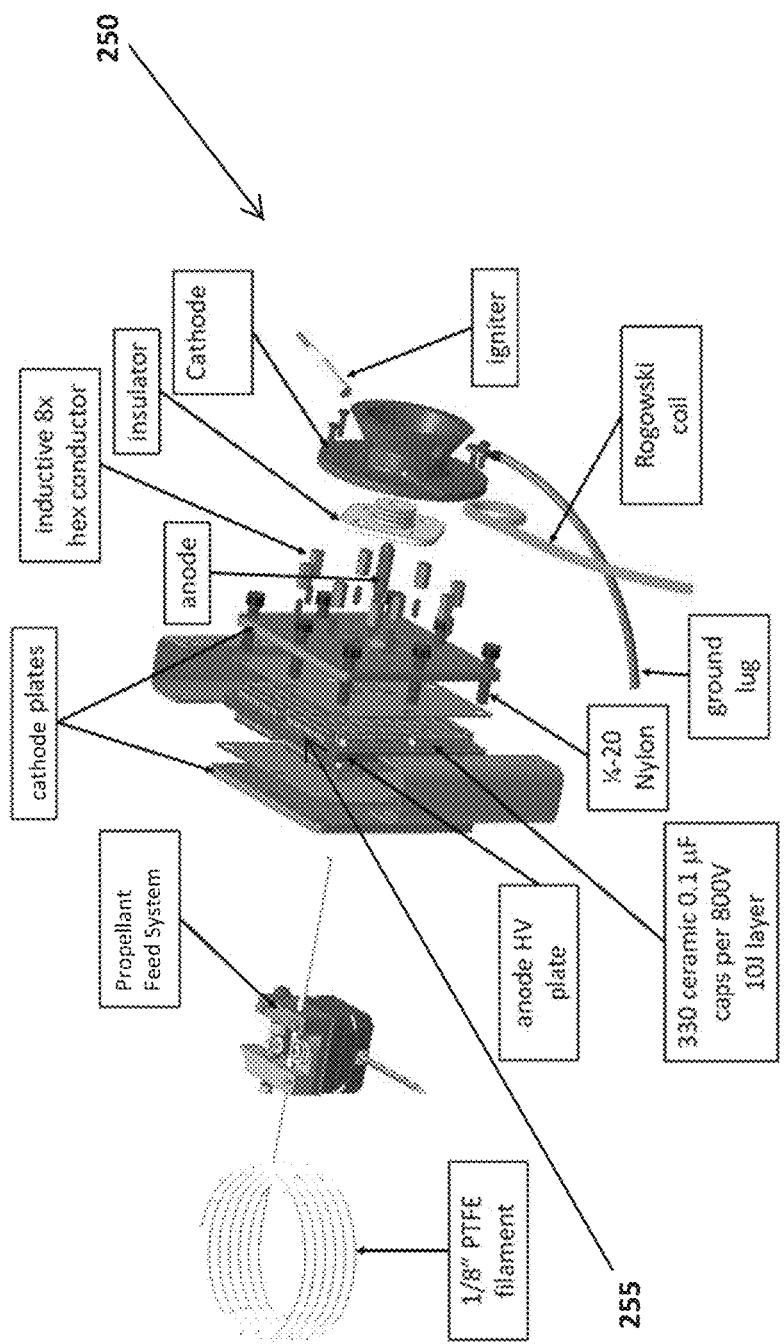
FIGS. 10A, 10B and 10C are FPPT designs with a square two-layer capacitor bank that holds 644 MLCCs for a storage capacity of ~15 kJ of energy storage at 800 V.
Figure 10B:
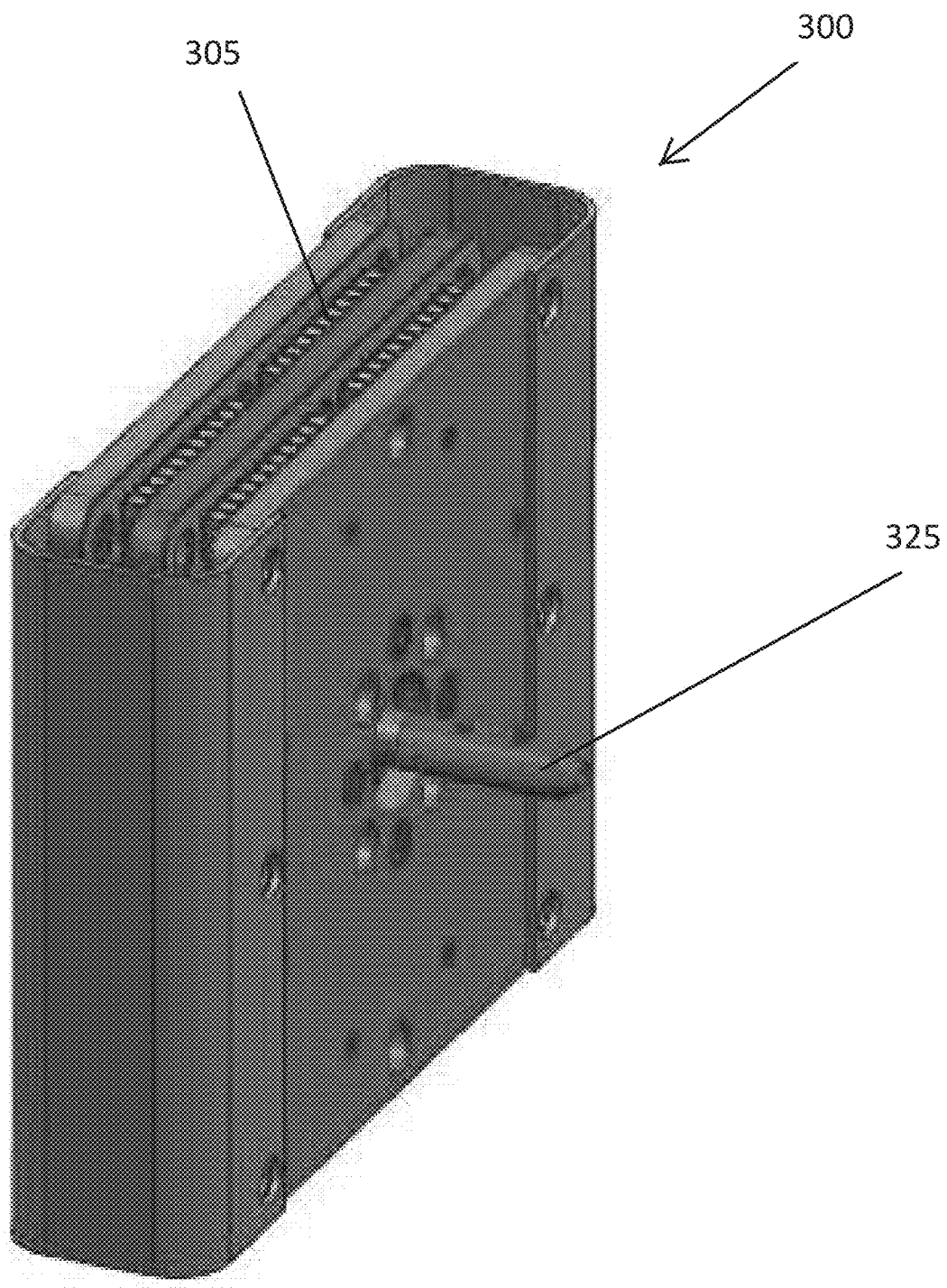
Figure 10C:
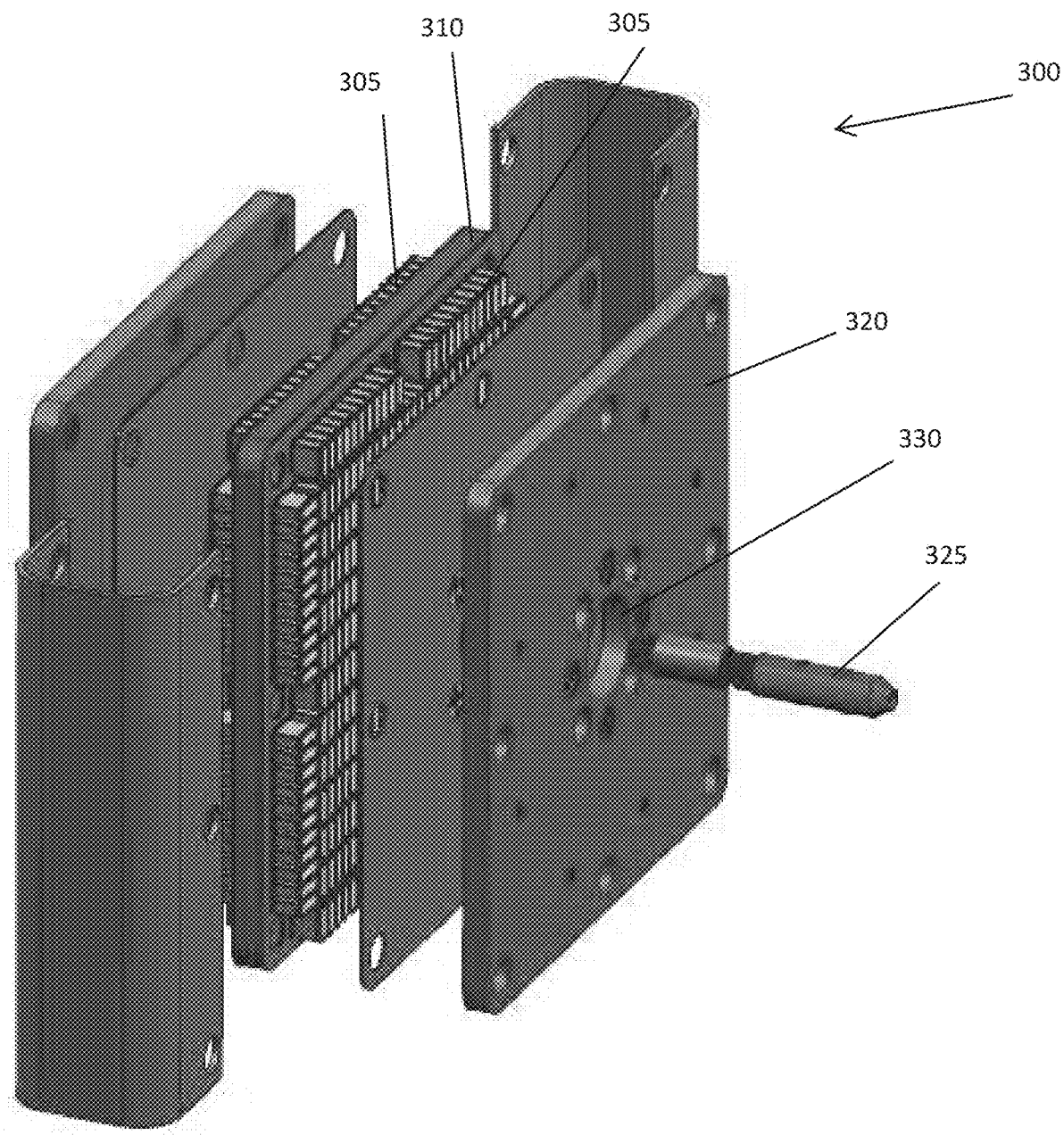
Figure 11:
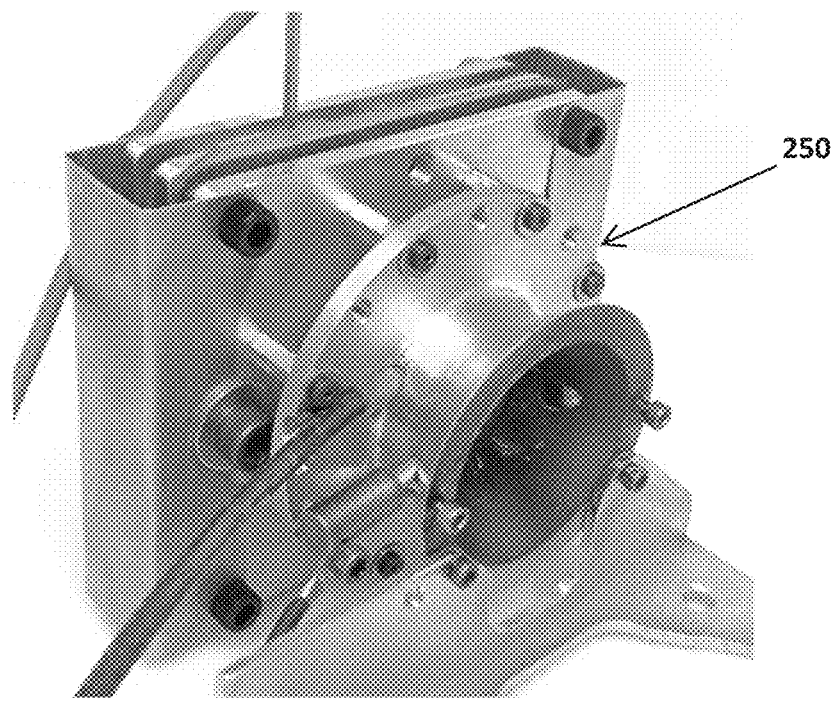
FIG. 11 is a photograph of an FPPT system including capacitor bank with demonstrated Isp >2400 s, 279 g MLCC capacitor bank, and specific thruster dry mass <10 kg/kW.

FIGS. 10A, 10B, and 10C show views of the FPPT design 250 including the enhanced capacitor bank 255 in a square pattern that holds 644 MLCCs and also conforms better to the 1 U CubeSat form factor. A photograph of the assembled compact FPPT configuration is shown in FIG. 11.

To evaluate the risk of capacitor failure beyond the hundreds of thousands of thruster firings performed in development, accelerated life testing of the ceramic capacitors is being conducted. A cluster of 6 capacitors has been operating 24/7, charging to 800V and discharging through a representative load that matched inductance and resistance at ~50 Hz. Greater than 500 million charge/discharge cycles have been accumulated, which is a strong indicator that capacitor failure risk is low.

In summary and as illustrated in FIGS. 10B and 10C, a capacitor module 300 is made up of a plurality of ceramic capacitors 305 (as described herein) that are mounted on one side or on both sides of a capacitor back plate 310. The configuration of the capacitors mounted will be dictated by the shape and profile of the back plate. As illustrated throughout, the configuration may be in concentric circles when the shape of the back plate is circular, or quadrilateral if the shape of the back plate is square, rectangular, etc. In addition, to increase the capacitance, ceramic capacitors may be mounted on front and rear sides of the back plate or sandwiched between layers of back plates. The capacitor bank 300 further includes a front plate 320. Both the back plate and the front plate 320 include an opening (back opening 325 and front opening 330) to receive an anode 332 (or a first electrode positively charged by the capacitor bank). A bank insulator 335 is fitted in the front opening to Insulate the front plate 320 from the anode 325 and further ensure the front plate 320 does not become charged by the capacitor bank. The front plate 320 is further secured to a cathode 340 (or a second electrode negatively charged from the capacitor bank). A capacitor bank consisting of one or more parallel-connected modules 300 is electrically connected to a power processing unit. The capacitor bank being configured to lower an equivalent series resistance and thus raise $\vec{j} \times \vec{B}$ thrust. The anode 325 may further be bored through to receive and expel a propellant, which will be expelled into a region 345 defined by the cathode.

For purposes of producing thrust, the region would then be exposed to a primary high energy discharge between the anode and cathode thereby creating a radiating plasma that vaporizes the propellant. The vaporizing propellant is dissociated and ionized to create a partially ionized gas ejected outward from the cathode region to produce thrust.

Igniter Development

Key FPPT testing and development goals are the minimization of anode erosion, maximization of igniter life, and demonstrated high propellant mass throughput. Anode erosion and propellant throughput are easily measurable. Igniter longevity is recognized as a technical risk by Applicant. The 0.25" igniters used by PPT-11, FIG. 1, were custom-made by Unison Industries, and are no longer available for purchase. They utilized a central anode, exterior nickel cathode body, and a semiconductor layer to help initiate breakdown by lowering breakdown voltage. These igniters were designed to spray electrons towards the central positive high voltage (HV) electrode of a coaxial PPT. Carbon from operation helps to prevent erosion. However, it is known that carbon tracking between the semiconductor and the insulator ultimately causes igniter failure, and one such failure was observed during testing.

Figure 12A:
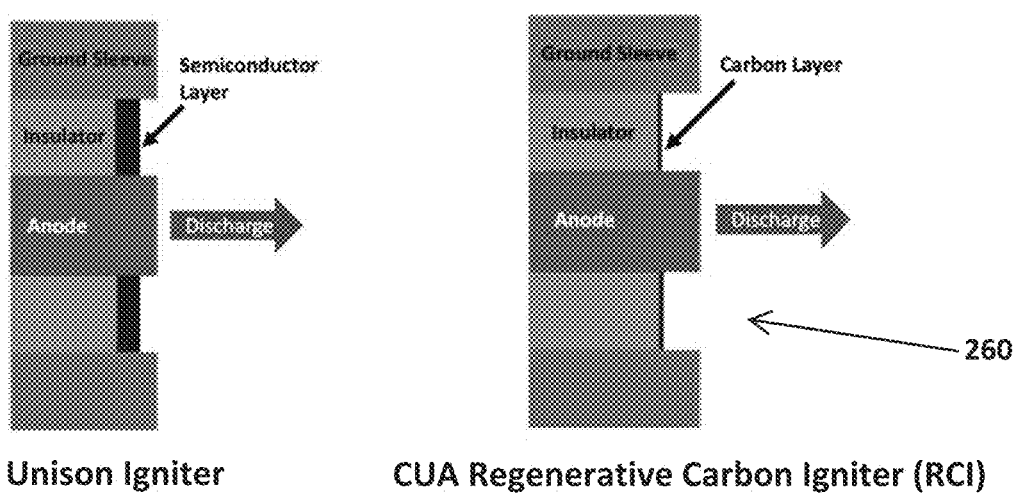
FIG. 12A is an illustrative comparison between a semiconductor gas turbine and PPT Unison igniter and an igniter in accordance with one embodiment of the present invention with a regenerative carbon igniter (RCI) designed for longer lifetime.
Figure 12B:
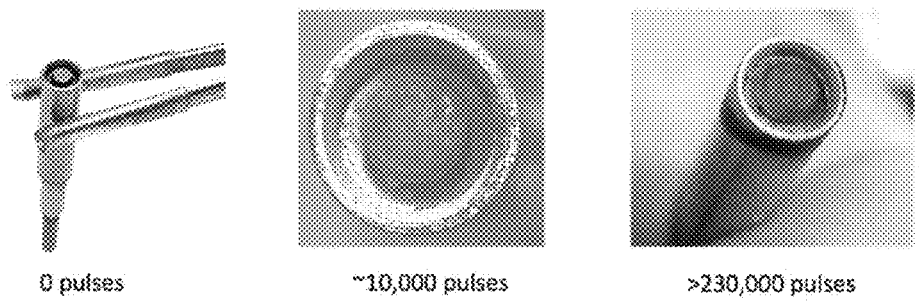
FIG. 12B is a Regenerative Carbon Igniter (RCI) in accordance with one embodiment of the present invention.

Applicant developed a new coaxial regenerative carbon igniter (RCI) plug 260 which relies only on carbon deposits from the PPT for ignition and lacks the semi-conductor layer. FIG. 12A illustrates the difference between the two types of igniters. The Applicant igniter plug has demonstrated reliable operation from atmospheric pressure down to mTorr vacuum levels and provided an ignition plasma for all testing (>1,000,000 pulses). It consists of a stainless-steel positive center electrode, ceramic insulator, and outer nickel body cathode, FIG. 12B (note that the Applicant and Unison igniters look nearly identical, therefore the Unison igniters are not shown for clarity). The principle advantage of the Applicant igniter design is that the stainless-steel central anode ablates slowly, ensuring that the RCI is regeneratively replenished. Multiple igniters can be used if necessary for very high impulse missions. Other metals and insulators may be used for the RCI.

Four igniters positioned around the primary thrust axis may be oriented to provide a small attitude control system and/or thrust vectoring capability if desired.

On one occasion during development an igniter failed. This was due to igniter cathode sputtering that created a conducting path across the igniter insulator. The RCI was then cleared simply by application of a 24 VDC pulse to the electrodes and remained operational for the duration of the program. Therefore, Applicant is presently of the belief that the igniters can periodically be cleared as needed through the use of a simple additional DC electronics circuit and software to sense and clear any fouling incidents on orbit. Applicant believes that these clearing operations should work indefinitely, with irrecoverable failure only resulting from complete erosion of the device.

Anode Development

Copper 145 (Tellurium Copper) was used for the anode to observe erosion patterns; notably this material is readily available and inexpensive. Results with the anode in the FPPT configuration proved to be far lower erosion rates than anticipated. Compared with prior PPT-11 results, we measured a >10× reduction in anode erosion rate, down to ~0.2 µg/pulse (from a 13,000 pulse, 21 J data set). This measured anode erosion rate is compared to a Teflon ablation rate of ~9.6 µg/pulse supports an anode that can survive >$10^8$ pulses with common electrode materials. When operating in high-Isp modes, anode erosion is eliminated altogether, with the regenerating carbon fully protecting the anode for the total of >10⁷ pulses. Anode materials are not limited to Copper 145 and may be composed of different metals or electrically conducting materials.

FPPT Performance Measurements

Breadboard Operation and Discharge

Figure 13A:
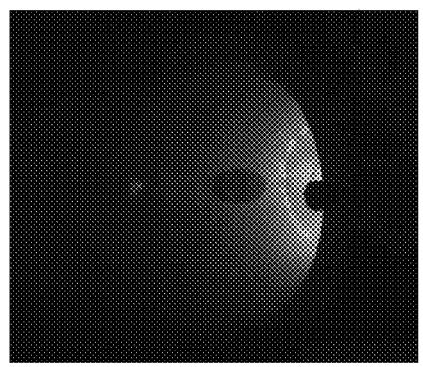
FIGS. 13A and 13B show breadboard FPPTs during operation at ~500 V with ~3 µs pulses.
Figure 13B:
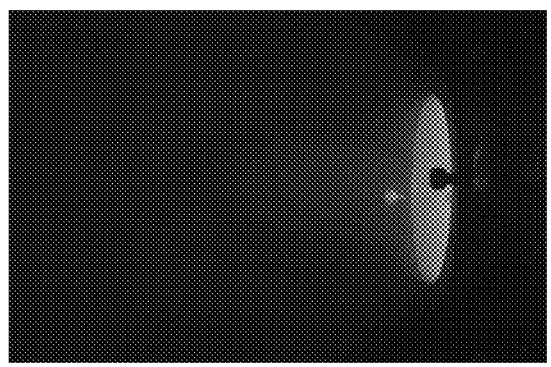

Testing of the breadboard FPPT (FIG. 11) was performed. Hundreds of thousands of pulses at approximately 800 V run were run without failure. The only capacitor failures occurred when the capacitor banks were tested to the rating limit (1000 V) of the Individual MLCCs. Testing resulted in a measured PTFE mass loss of 5-13 μg/pulse depending upon pulse energy and feed rate. The metal electrode saw a very low mass loss of ~0.1 μg/pulse over the life of the development program. Voltage traces indicated a half-cycle time from ~3 μs to ~15 μs, depending on bank energy and added inductance. FIGS. 13A and 13B show photographs of the breadboard FPPT during operation. Based upon the uniformity observed in photographs of the cathode (FIGS. 13A and 13B), Applicant is achieving discharge symmetry as expected (as opposed to spoking operation).

Figure 14A:
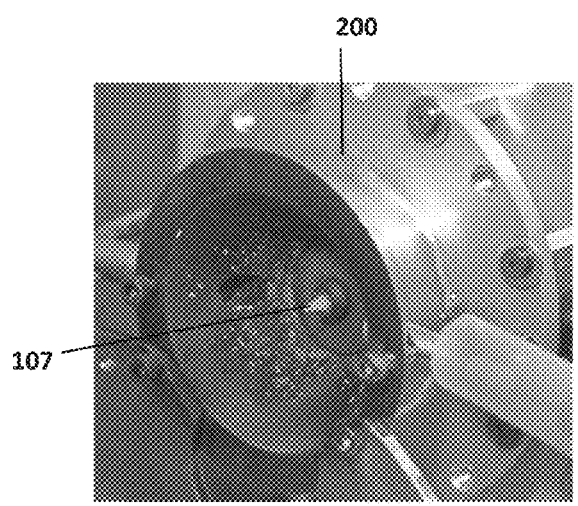
FIGS. 14A and 14B are photographs taken after (FIG. 12A) and during (FIG. 12B) FPPT testing, with operating conditions of ~17 kA, 800 V, 66.1 µF, 5 Hz at 20.6 J/pulse, and a feed rate of 7.7 µg/s.
Figure 14B:
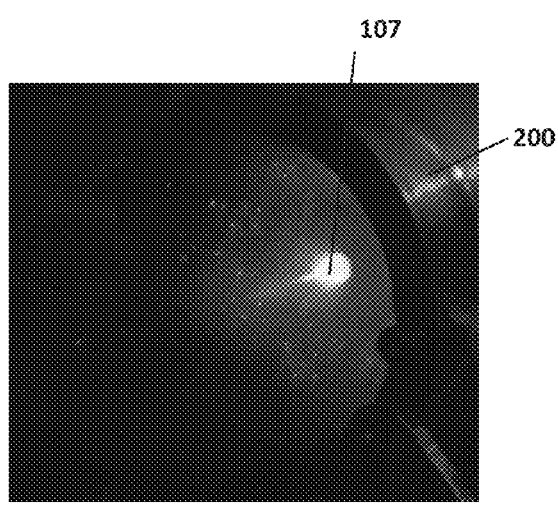
Figure 15A:
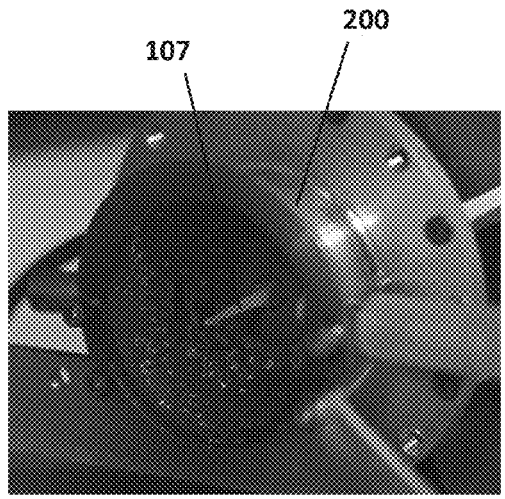
FIGS. 15A and 15B are photographs taken after (FIG. 13A) and during (FIG. 13B) FPPT testing with operating conditions of 14.0 kA, 768 V, 32.4 µF, 0.0022 Torr, 4 Hz pulse rate at 10.7 J/pulse, and a feed rate of ~12 µg/s.
Figure 15B:
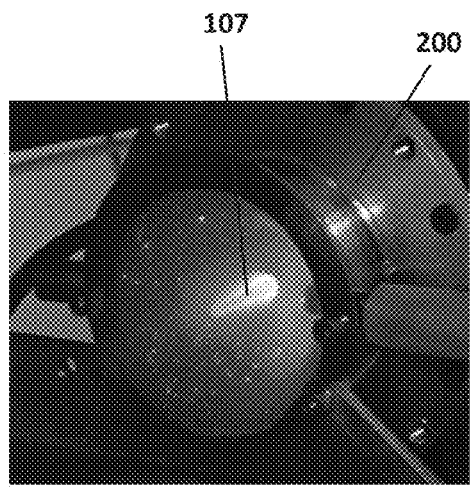

Testing involved several operating conditions. One of the important findings was that the feed system could provide a reliable and variable rate of feed without having the feed stop. This results in the plasma discharge self-forming a shaped (usually conical) end tip to the propellant, a very interesting and unique development and capability with FPPT. FIGS. 14A and 14B shows an operating condition in which the Teflon fiber is slightly protruding into the discharge region. An important feature to observe is the plasma pinching effect at the fuel tip (discussed below). FIGS. 15A and 15B shows how different operating conditions can result in the propellant significantly protruding into the discharge region and forming a stable conical shape.

It was noted that, over a range, the thruster consumes PTFE at the rate it is fed by a microprocessor-controlled stepper motor drive set to advance the fiber ~0.2 mm every 200-500 thruster pulses (interval is chosen by operator). When not fed quickly enough a fuel-starved condition is entered during which increased anode erosion is observed. Fuel-rich feed results in lower anode erosion rates and lower $I_{sp}$. Control of the PTFE feed rate without a fuel stop provides a trade between specific impulse and thrust and represents a dramatic advantage of FPPT over prior developed PPT systems.

Figure 16:
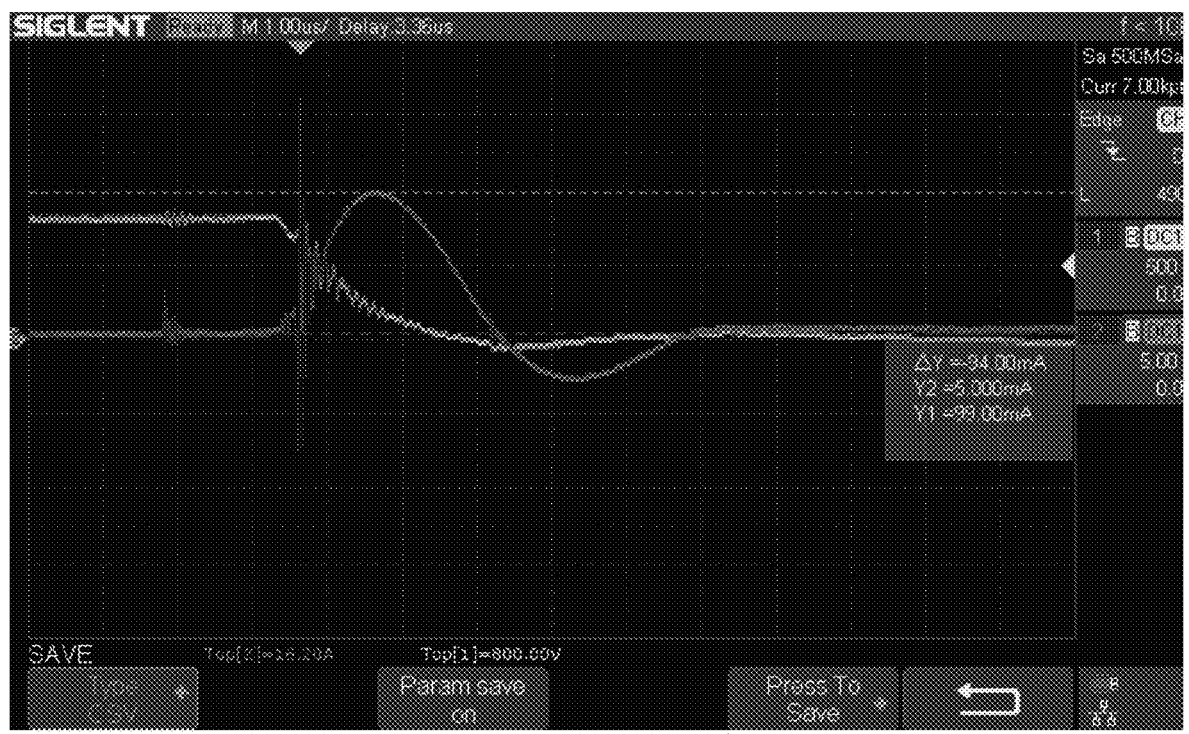
FIG. 16 is an illustration of a 5.5 J, 800-volt FPPT current pulse taken using the Rogowski coil. The purple trace is current with a 103 A/mA calibration factor showing ~10 kA, and the yellow trace is anode voltage in volts.

A typical waveform of the pulse current is shown in FIG. 16 for a 17.5 μF, 800 V, 5.4 J, 10 kA case with a 2.5 μs first half cycle. Higher pulse currents are achieved with increased energy.

Thrust Stand Measurements

Thrust measurements using a 6-second period "Watts pendulum" thrust stand were taken to evaluate FPPT performance (thrust, $I_{sp}$, and efficiency). A single module capacitor bank having a nominal capacitance of 33 μF, a double module capacitor bank with a nominal capacitance of 66 μF, and a quad module bank with a nominal 132 μF were all tested, FIGS. 17-19. Data taken at various energies show thruster efficiency increasing with energy and $I_{sp}$, as expected. The highest efficiency was measured with the quad module 33.3 J capacitor design.

Steady state average thrust while pulsing is measured on the thrust stand by measuring deflection. Before every data set, the thrust stand deflection is calibrated. To obtain specific impulse, the calibrated mass flow rate of the thruster is used. The propellant advance per feed motor stepper pulse is calibrated over 1000 s of feed motor pulses at various feed rates and conditions to verify its consistency. For example, one motor feed pulse every 200 thruster pulses yields a mass flow rate of 15.5 μg/pulse for the nominal 3.2 mm PTFE fiber. With an accurate linear density and linear feed rate, the prescribed mass flow rate is consumed by the thruster at high accuracy after an initial burn-in to establish the propellant tip cone. Other mass losses are not considered in these specific impulse determinations, as preliminary testing indicates anode and igniter mass ablation is between 0-2%, depending on operating conditions where higher Isp operation ablates a lower fraction of the total mass expelled.

Figure 17:
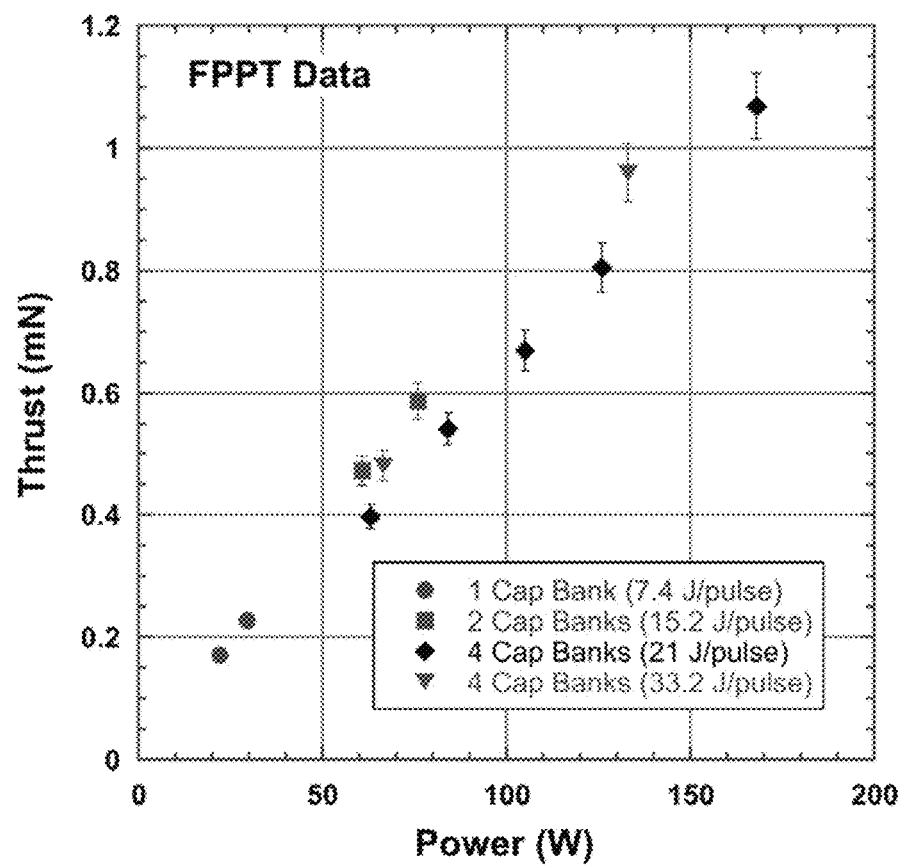
FIG. 17 illustrates total thrust versus input power as a function of four different operating conditions (using three different capacitor banks)

FPPT thrust measurements for continuous pulsing are shown in FIG. 17 as a function of power input and operating conditions. Each set of data represents the same operating conditions at different pulse rates showing that thrust is directly proportional to pulse rate and correspondingly total power input. For the data shown in FIG. 17 the lowest pulse rate was 2 Hz and the highest was 8 Hz; note that lower pulse rate operation is easily done due to the nature of a PPT. Each of the 4 unique operating conditions shown was fired for a minimum of 10,000 shots before taking the thrust measurement to ensure a properly formed propellant cone, thereby ensuring an accurate Isp calculation. FIG. 17 contains 44 unique thrust measurements (for clarity, only a sampling of the total number taken is shown), each of which is an average of the turn-on and turn-off thrust level with a ±5% shot-to-shot repeatability.

Figure 18:
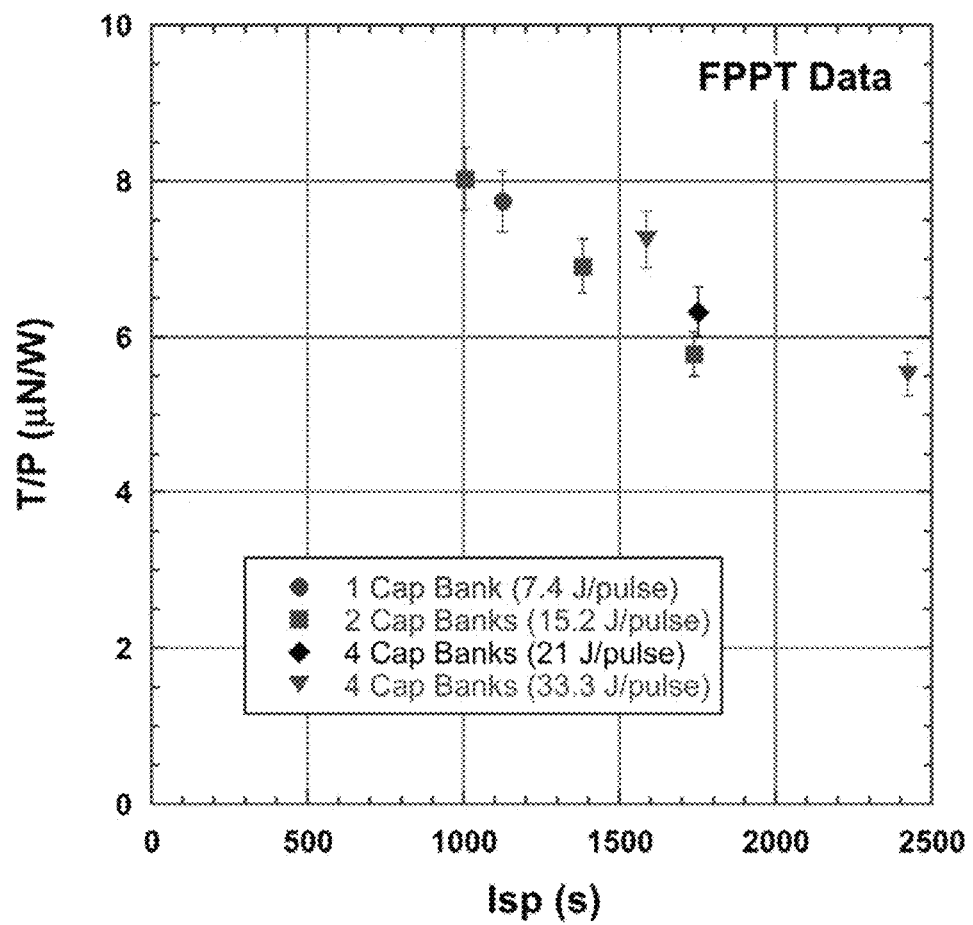
FIG. 18 illustrates specific thrust vs. specific impulse as a function of four different operating conditions (using three different capacitor banks) showing higher performance with increasing bank energy.

FIG. 18 shows specific thrust (μN/W) as a function of the specific impulse for different capacitor banks and energies per pulse. In each case, higher Isp is the result of lower mass per pulse, and higher thrust arises from increased mass per pulse. The original FPPT goal of 1200 s Isp was significantly exceeded, with peak performance surpassing 2400 s. This particular point was measured six times, three at 4 Hz and 2 Hz pulse rates respectively, and as always were preceded by over 10,000 firings to ensure an accurate feed rate determination.

Figure 19:
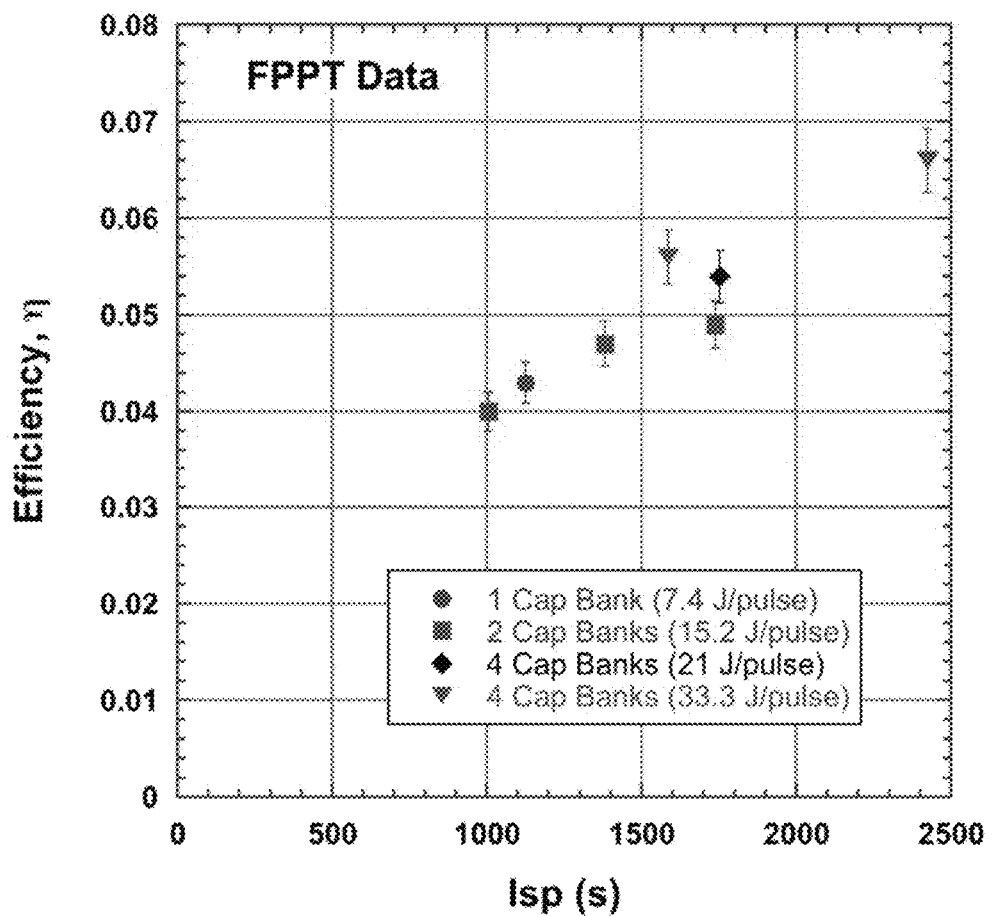
FIG. 19 illustrates thrust efficiency vs. specific impulse as a function of four different operating conditions (using three different capacitor banks)

FIG. 19 shows thruster efficiency as a function of specific impulse. The 2400 s condition is the most electrically efficient case at over 6.5% but results in reduced specific thrust (FIG. 18). Heritage PPT-11 data show that efficiencies exceeding 10% are possible, and ongoing development is expected to yield efficiencies exceeding this 10% mark. Thruster efficiency is computed by dividing the thrust power $(T^*U_e/2)$ by supply power. The capacitor charging power supply input is monitored, and its rated efficiency is applied to the measured supply wall power draw when calculating the power into the thruster capacitor bank. To date, efficiency increases have been modest with higher discharge energy and more significant with higher Isp (via feeding less propellant per pulse). As a result, operating at high efficiency provides a corresponding lower thrust, and requires more thruster firings to consume a given propellant load. Conversely, high thrust operation is less efficient, but requires fewer thruster firings. Ongoing research at Applicant is examining increases in efficiency via optimizations of propellant diameter, anode geometry, cathode geometry, and discharge impedance matching.

FPPT Analyses

Lumped Parameter Circuit Model

From PPT-11 studies, high peak current is desired for $\vec{j} \times \vec{B}$ forces to dominate the thrust (rather than electrothermal). A circuit model has guided FPPT development. Further refinement of the modeling follows FPPT current measurements.

Figure 20:
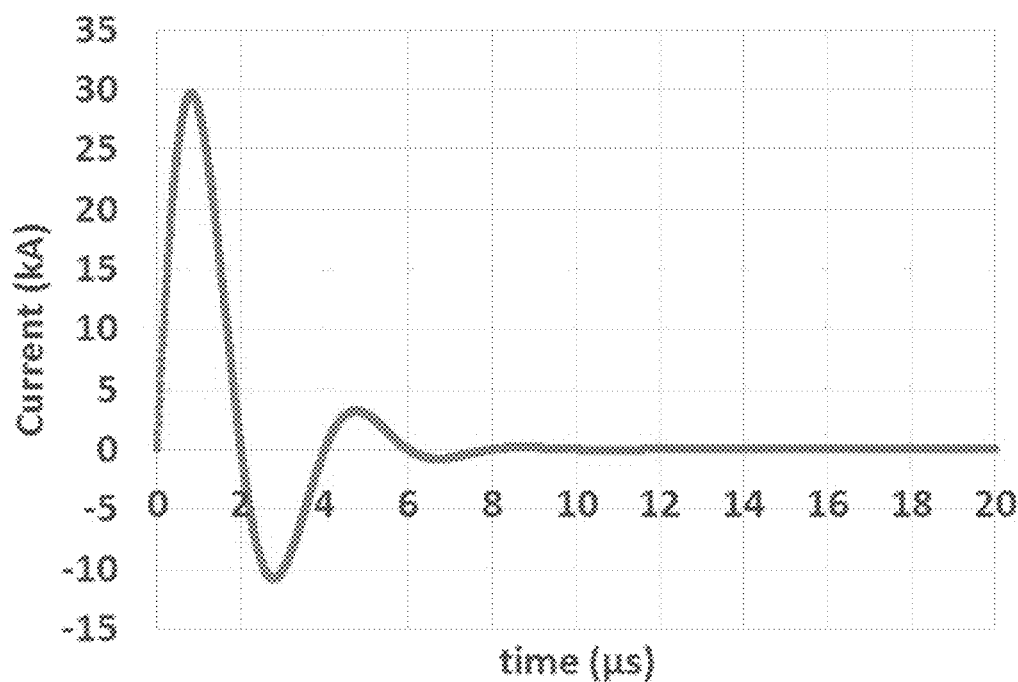
FIG. 20 illustrates the predicted pulse shape from a lumped parameter circuit model for a 30 kA pulse.

A lumped parameter circuit model predicts the experimental waveform with reasonable accuracy; compare the qualitative predicted shape in FIG. 20 with an experimental trace, FIG. 16. The model derives from PPT-11 heritage which also showed a close match to experimental data. The FPPT waveform will look similar to FIG. 20 having >30 kA, $T_{half}$>2.0 µs. The waveform and inductance model predict electromagnetic (EM) $I_{bit}$ and is underdamped. A sample pulse is shown in FIG. 16 having a 2.00 µs half-cycle for 10 mΩ, 10 J, 750 V, and 35.9 µF.

Electromagnetic Thrust Component Analysis

Figure 21:
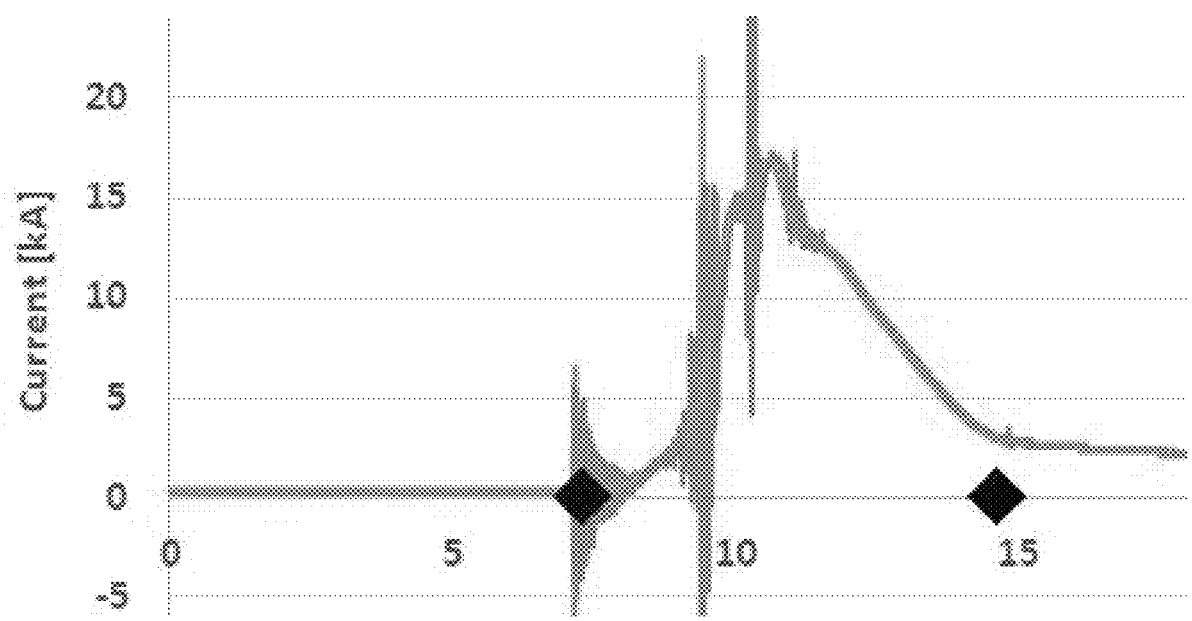
FIG. 21 illustrates a FPPT current pulse trace with a peak current of ~17 kA.

A current pulse trace from the FPPT is shown in FIG. 21. Bank energy is 19 J at 800 V. Peak current is ~17 kA, and pulse duration is ~6 µs. The impedance of the bank is matched to the discharge, as no current reversal is observed. The characteristic impedance of the LRC circuit is $(L/C)^{1/2}$=13.5 mΩ, indicating 27 mΩ for the discharge. Impedance matching is essential for high, low reversal currents to protect the capacitors.

The total impulse bit resulting from the current pulse must be measured on a thrust stand, but the EM component can be calculated from:

$$I_{bit} = \frac{\mu_o}{4\pi} \int I^2 dt \left[ \ln\left(\frac{r_c}{r_a}\right) + \frac{1}{2} \right]$$

where $r_c$ is the radius of the annular cathode and $r_a$ is the radius of the central anode. The current-squared "action integral" over the pulse length is measured as Ψ=591 A²-s, and the resulting EM impulse bit is 0.092 mN-s. The measured total impulse bit at the equivalent mass flow rate of 31.0 µg/s is 0.105 mN-s, therefore the parameter β is 0.092/0.105=87%. While the EM contribution in FPPT is already high, further increases in peak current will increase ionization fraction, thruster efficiency, and the percent EM contribution.

FPPT Acceleration Mechanism

Figure 22:
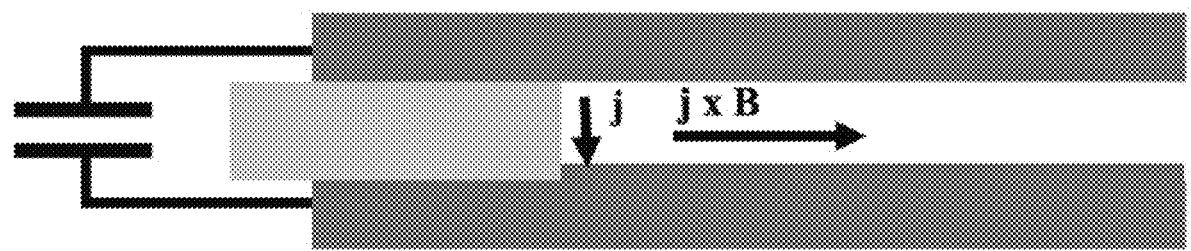
FIG. 22 is an illustration of the classic parallel-plate PPT design with current and acceleration directions.

The coaxial FPPT operates in a different $\vec{j} \times \vec{B}$ mode than the classic parallel-plate PPT. For both the spring-fed parallel plate and coaxial versions of the classic PPT (FIG. 22) the current flows from anode to cathode parallel to the Teflon (PTFE) propellant face, inducing a high B field parallel to the face, both in the electrode gap and in the propellant, and a normal $\vec{j} \times \vec{B}$ force is directed away from the face in the flow direction. For this mode, it is well established that the PTFE solid surface is heated to 860 K by radiation, sublimates, and becomes dissociated, ionized and accelerated by $\vec{j} \times \vec{B}$.

Figure 23:
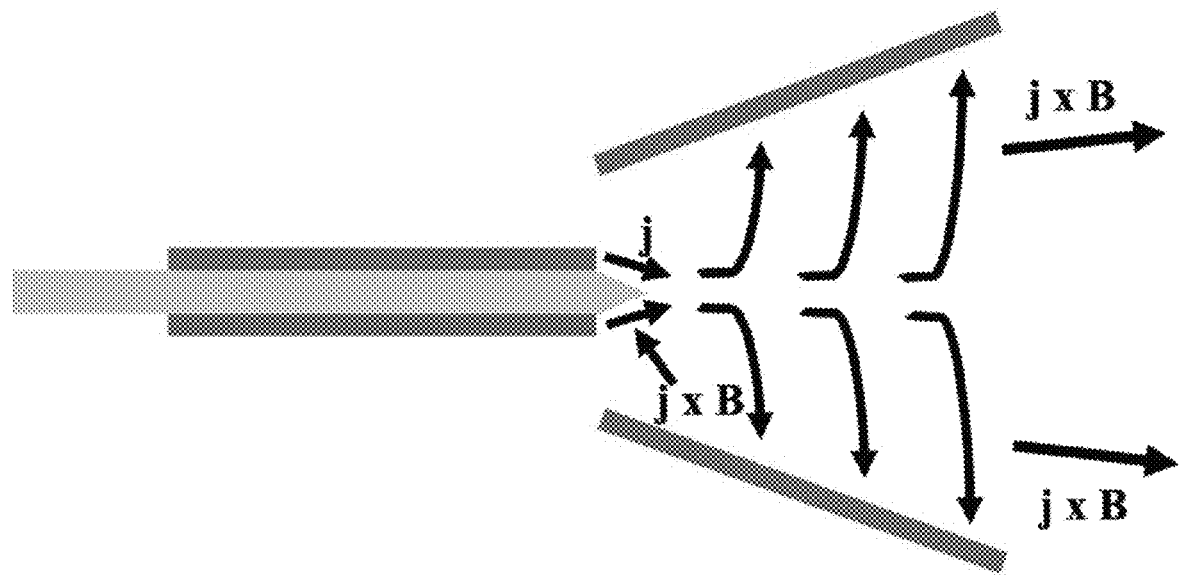
FIG. 23 is an illustration of the FPPT design with current and acceleration directions.

The FPPT uses a coaxial geometry with the PTFE propellant located on the centerline inside the central anode, as shown in FIG. 23. The self-magnetic field B is in the azimuthal or θ direction. For FPPT, the propellant diameter is 3.2 mm, and is fed continuously through the anode. The downstream conical shape of the propellant tip is a result of continuous propellant feed, with the cone angle decreasing with increasing feed rate. A typical half angle is 15-30 deg.

Figure 24:
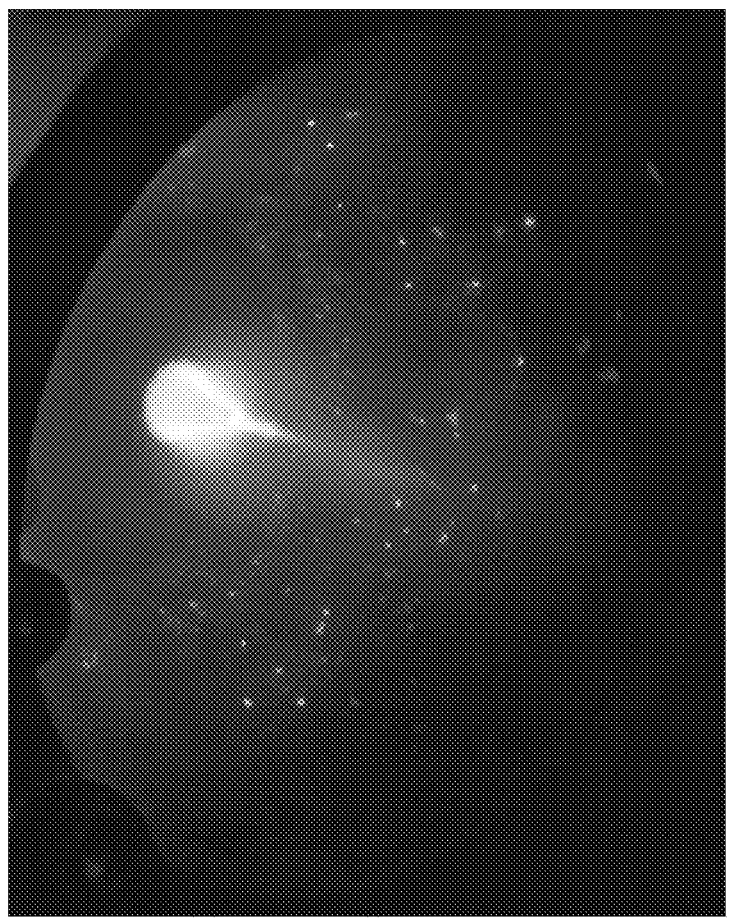
FIG. 24 is a close-up photograph of the FPPT plasma region showing pulse discharge symmetry and plasma pinching on the fuel cone and downstream on the axis.

Compared to the classic PPT, the conical geometry directs $\vec{j} \times \vec{B}$ radially inward and toward the Teflon face. Evaporated PTFE, once dissociated and ionized, is the primary current carrier. Peak currents in the discharge of 10 s of kA at small radius implies high $B_\theta$, which results in a strong plasma pinching effect and a pressure of several atmospheres. Evidence for this can be seen in FIG. 24 where the core plasma appears to be both pinched and symmetric. For an anode axial current radius of 3 mm and peak current of 30 kA, the resulting $B_\theta$ is 2 T, which corresponds to a magnetic pinch pressure of 16 atm, producing axial thrust on the anode.

The physics of the pinch plasma in the anode tip region is unique for pulsed electric thrusters. The region bears a resemblance to that of the magnetoplasmadynamic (MPD) thruster with a conical tip cathode, with significant differences in that the polarities are reversed, reversing the direction of $\vec{j} \times \vec{B}$, and the cone tip is non-conducting PTFE which is the source of mass injection from surface sublimation. Because the magnetic field is zero and the pressure is high on the PTFE surface, the sublimation, dissociation and ionization process will experience different physics in comparison to the classic PPT.

Figure 25:
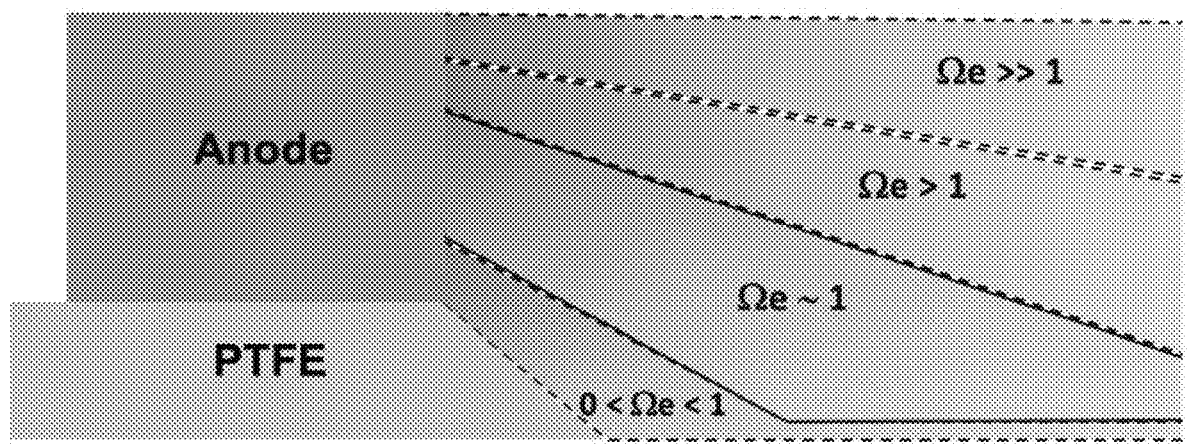
FIG. 25 is an Illustration of the predicted Hall parameter Ωe variation in the FPPT anode region.

The unique distribution of electron Hall parameter Ωe is shown in FIG. 25. With $\vec{B}$ and Ωe both zero along the PTFE surface, the electron conductivity is scalar in that region, allowing electron current conduction, joule heating near the surface, and ionization of the sublimating PTFE. Downstream from the anode and at the edge of the axial current column the B field strengthens, and the density decreases, so that Ωe becomes >1, and axial current is conducted mostly by ions. The $\vec{j} \times \vec{B}$ force near the anode is radially inward, keeping the ions near the axis. To complete the circuit, electrons must be emitted from the cathode or created in the discharge gap volume, subsequently migrating downstream toward the cathode exit by $\vec{E} \times \vec{B}$ drift.

It is anticipated that charge exchange collisions play an important role in the ion conduction process. Typically, the degree of ionization α is 30-70%, implying a significant population of neutrals (which must be accelerated electrothermally). Because the heavy particle elastic and charge exchange collision cross sections are of comparable magnitude, the E-field acceleration process is one where the ions acquire a drift velocity but then experience charge exchange, and drift for some distance as a neutral. A second charge exchange collision allows the newborn ion to accelerate again to a higher drift velocity, a process that continues as long as radial $\vec{j} \times \vec{B}$ is present. This process explains why higher discharge energies, accompanied by higher α, result in higher specific Impulse. The variation of the Hall parameter near the anode is shown in FIG. 25.

Flight-Like FPPT Model and Design

Figure 28A:
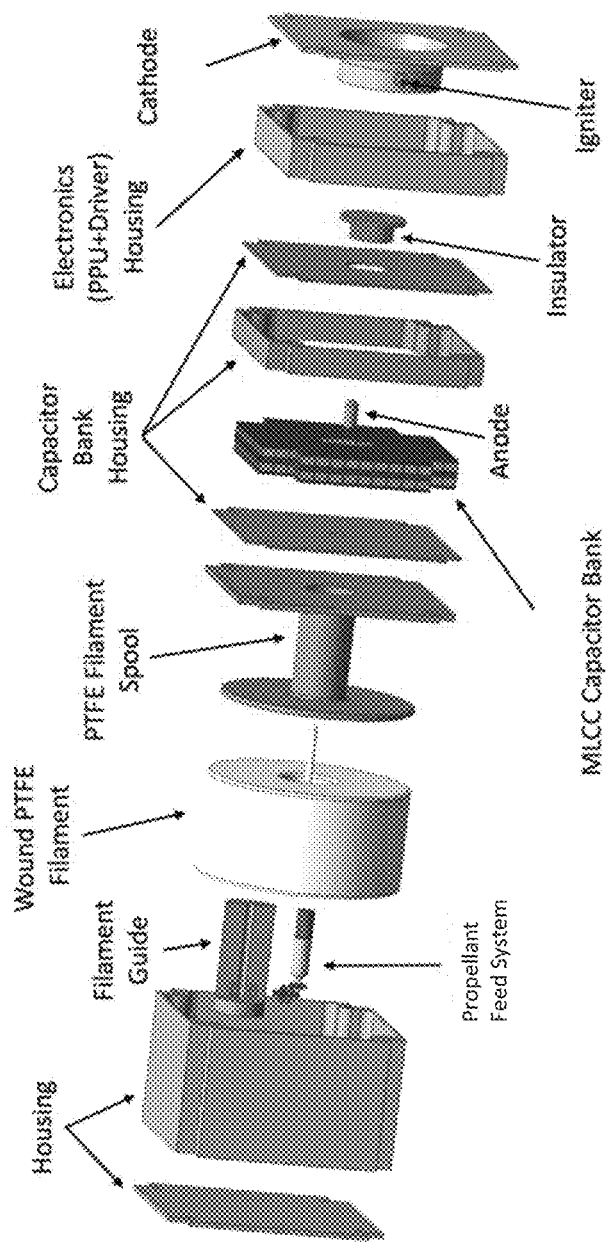
FIGS. 28A, 28B and 28C are views of an FPPT system in a 1 U volume envelope having sufficient PTFE propellant to achieve 10,000 N-s of total impulse.
Figure 28B:
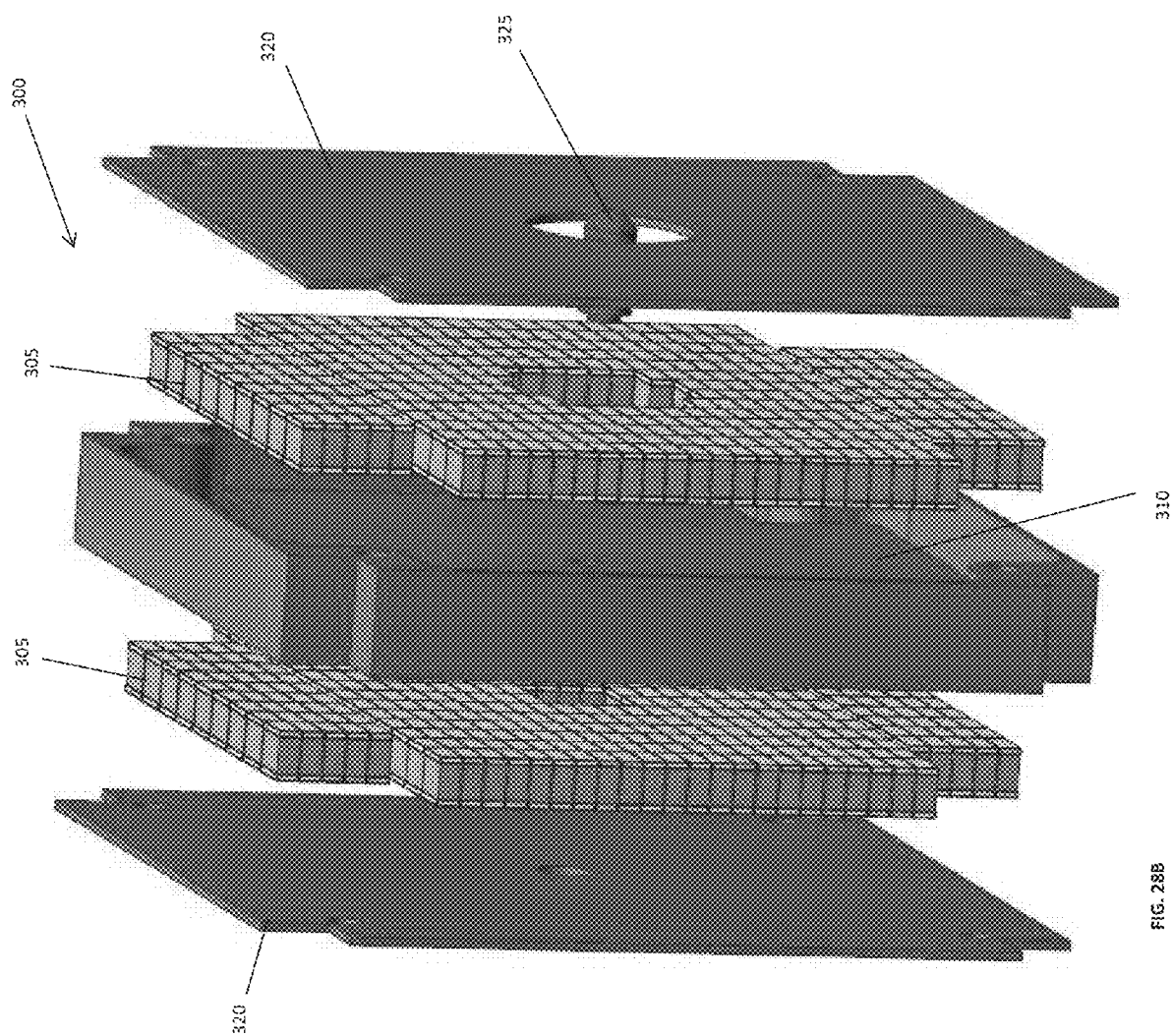
Figure 28C:
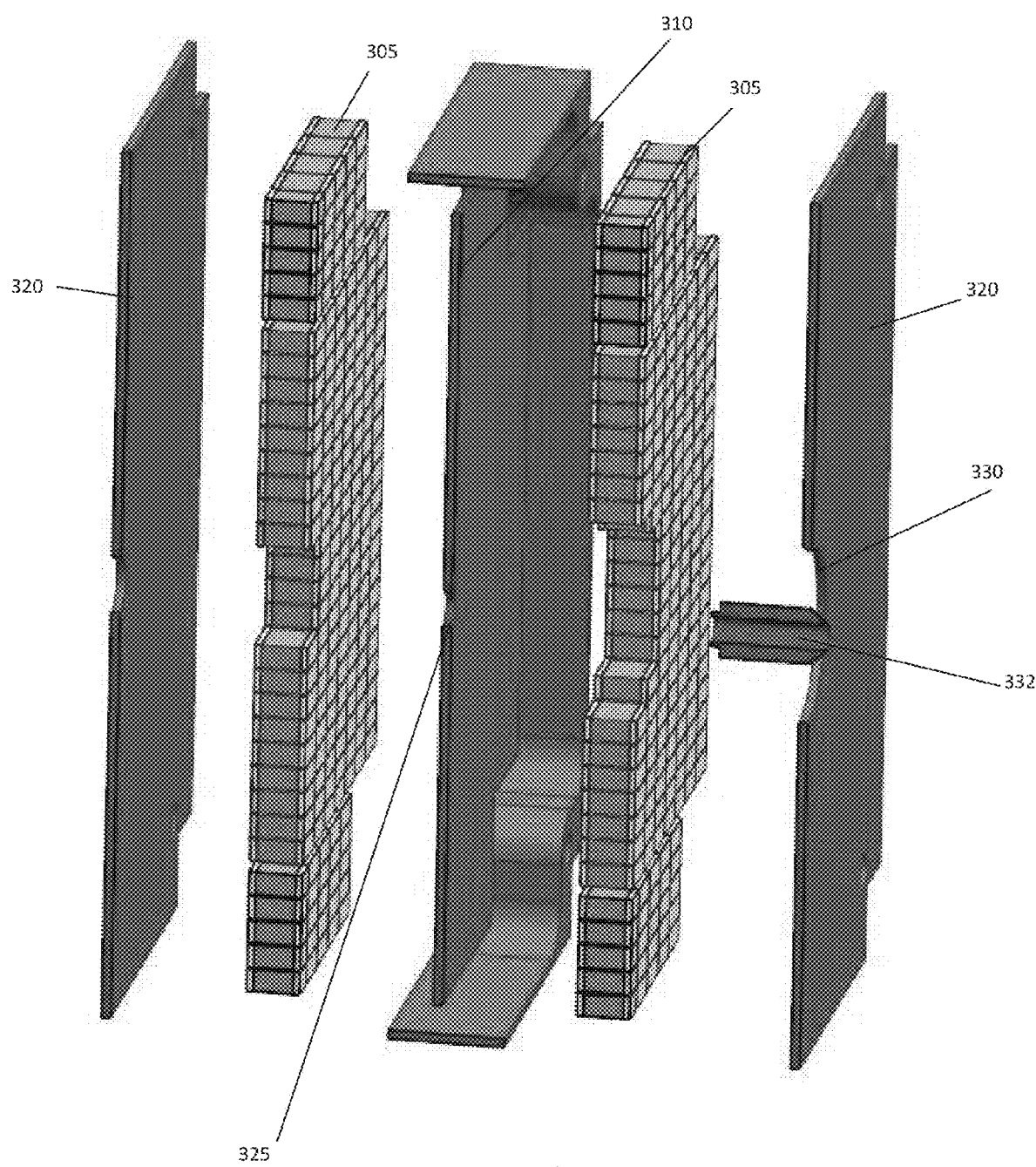
Figure 29B:
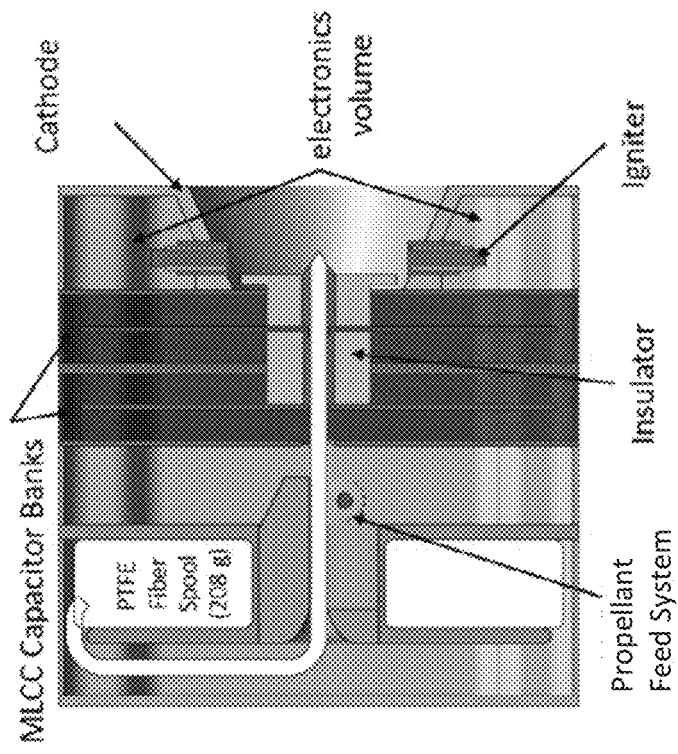
FIGS. 29A and 29B are 3D perspective and cutaway views of an FPPT system in a 1 U volume envelope featuring 40 J of capacitors with a partial propellant load having sufficient PTFE propellant to achieve 4900 N-s of total impulse @ peak Isp operation.
Figure 29A:
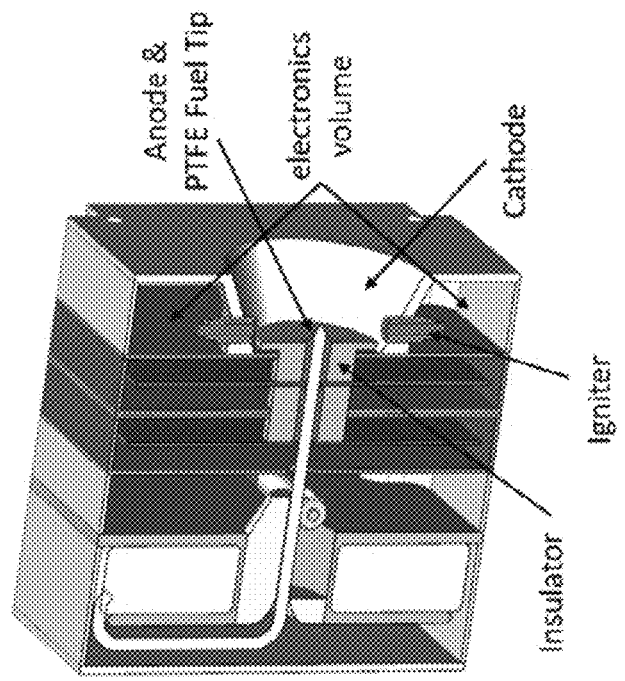
Figure 30A:
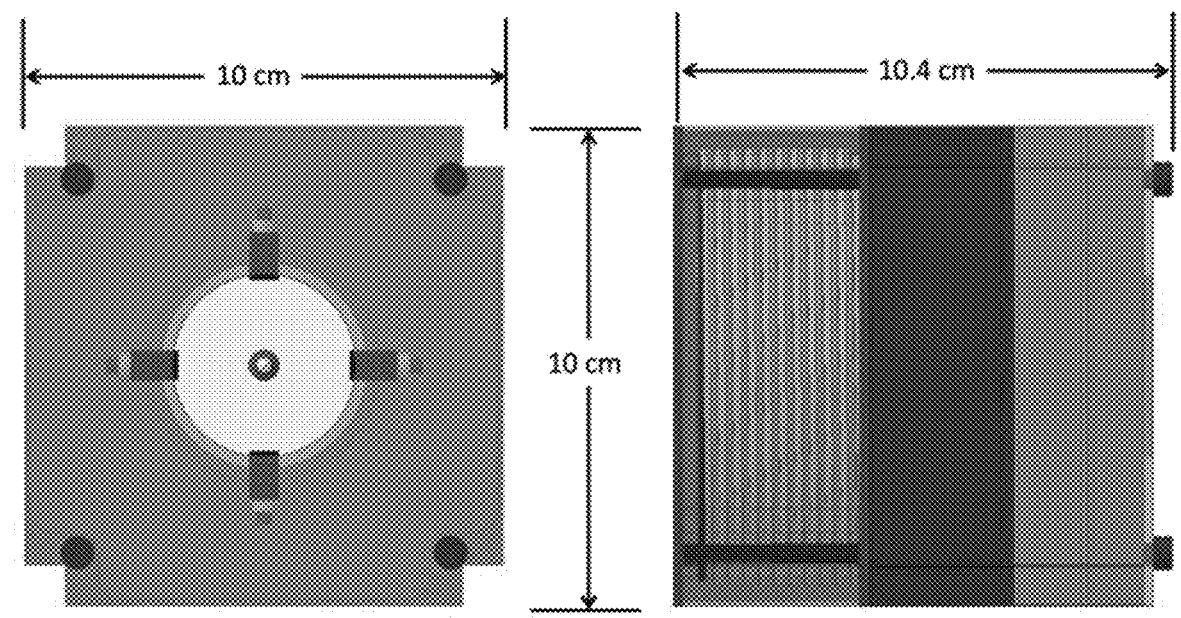
FIG. 30A illustrates 2D front and side illustrations of a 1 U embodiment having four (4) igniters and a cylindrical ring-shaped cathode.
Figure 30B:
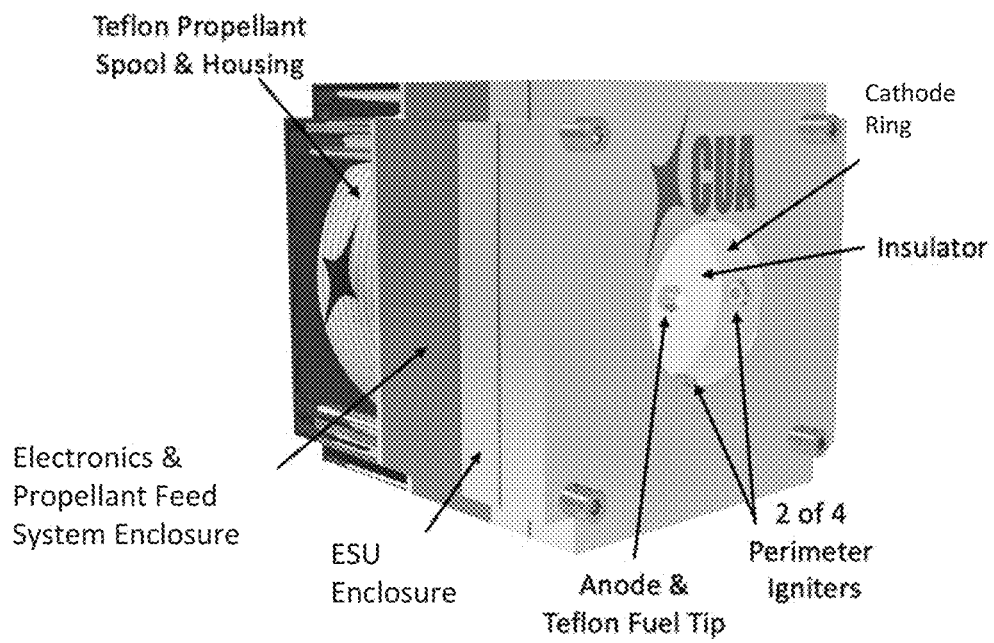
FIG. 30B illustrates a 3D perspective of a 1 U embodiment having four (4) igniters and a cylindrical ring-shaped cathode.

Flight-like FPPT CAD models were created to demonstrate that it is possible to package enough fuel for a 10,000 N-s thruster in a 1 U-sized (1 liter) volume. FIGS. 26A-C illustrates the basic 1 U package from the front, side, and back. FIGS. 27A-B shows a 3D perspective along with a cutaway view for a 10,000 N-s spool of PTFE. An exploded view of the design showing all of the different primary parts is shown in FIGS. 28A-28C. Note that the PPU and motor drive electronics package (circuit boards) are designed to fit in the volume between the cathode and the MLCC capacitor bank. While FIGS. 24A-B shows a tightly packed configuration in which it should be possible to achieve the ambitious goal of 10,000 N-s in a 1 U volume envelope, an alternative design will trade fuel volume in a 2,000 N-s design for increased capacitor energy storage to increase thruster efficiency, FIGS. 29A-B. Another embodiment of the 1 U package design is shown in FIGS. 30A-B in which there are four (4) igniters and the ring-shaped cathode is cylindrical rather than conical in shape.

Flight-Like FPPT PPU and Motor Board Design

A unified electronics board containing both the PPU and motor driver circuit are required to drive the FPPT system.

Figure 31A:
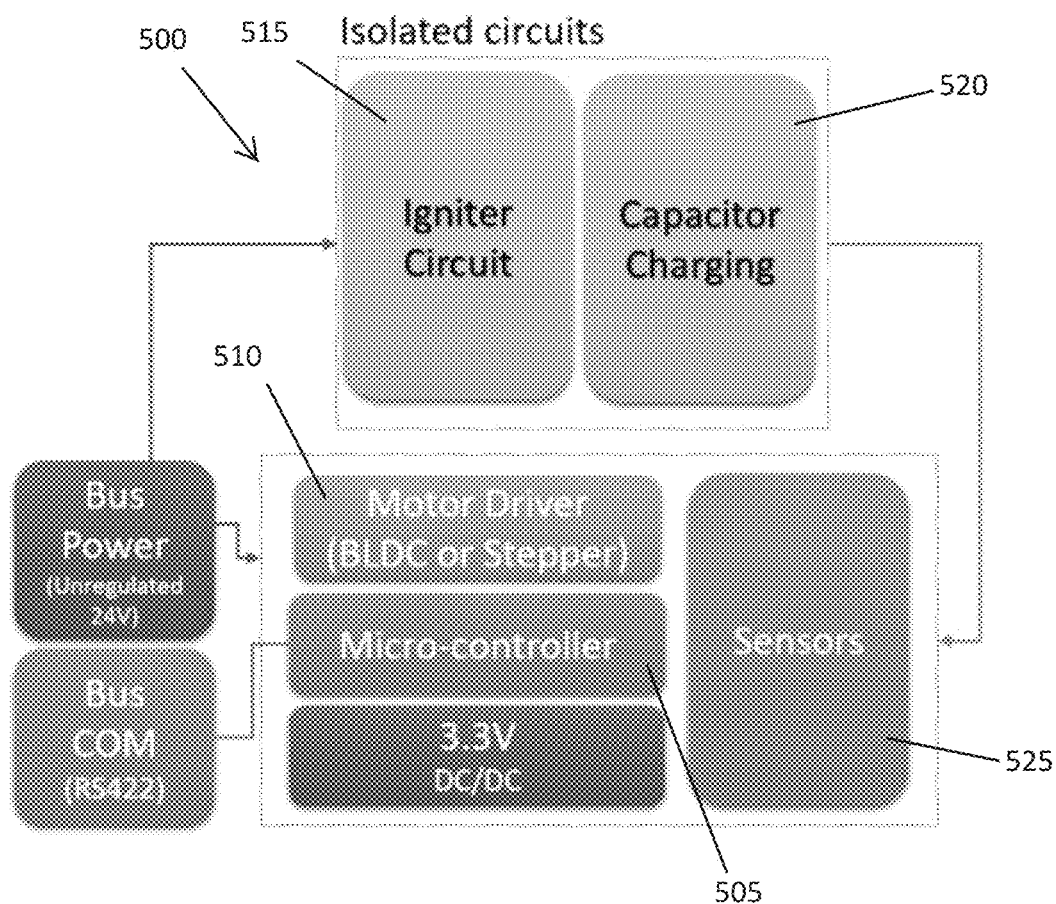
FIGS. 31A and 31B are schematics of a unified circuit board design containing a PPU, motor driver, and microprocessor controller electronics.
Figure 31B:
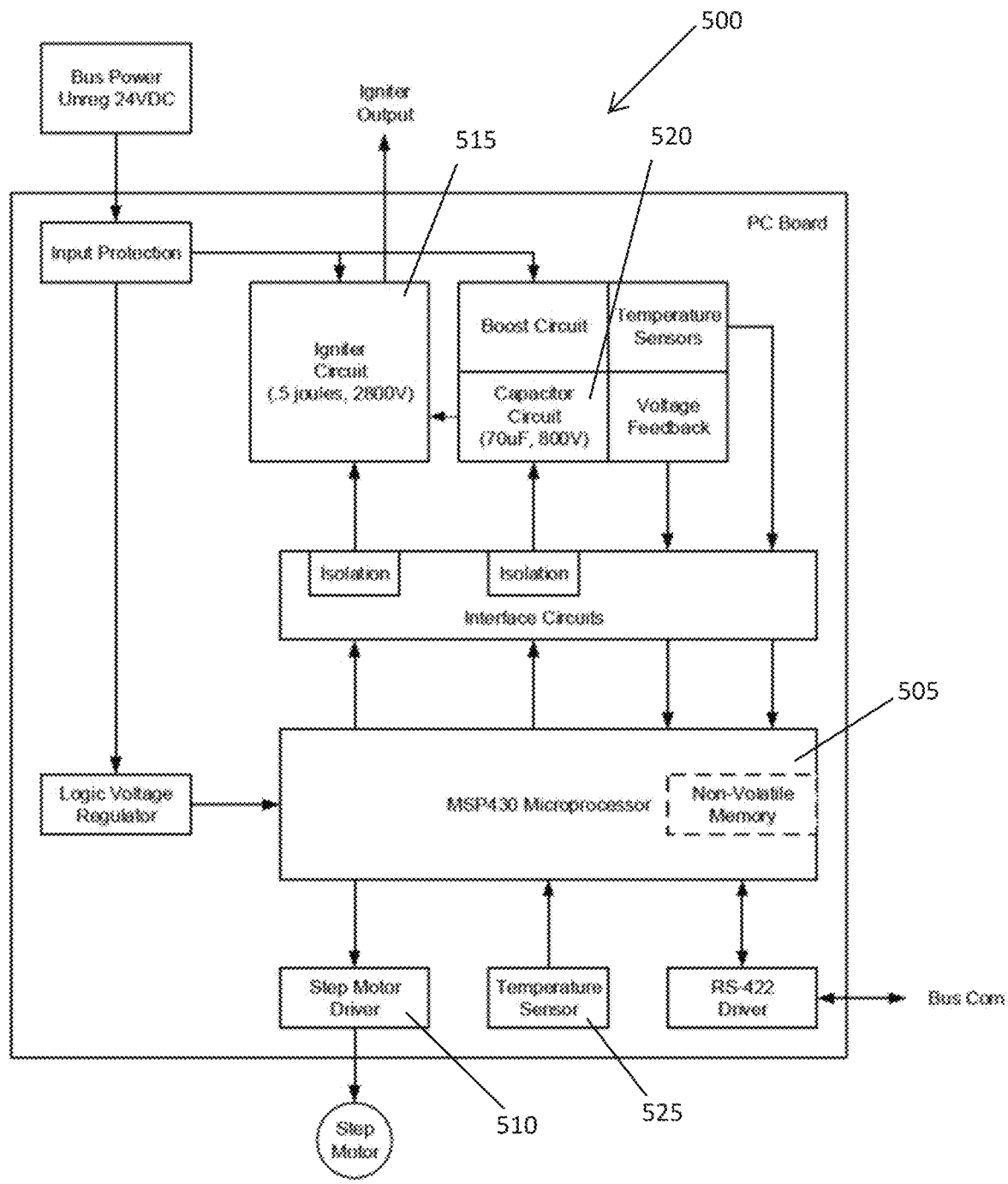

FIGS. 31A and 31B show block diagrams 500 of the unified electronics board with PPU, motor driver, and microprocessor controller electronics. The current design utilizes a 24V to 120V DC boost converter, and a 20:1 transformer for the igniter pulse from a 120V DC output that results in 2400 V ignition. A Dickson charge pump topology is anticipated for the main capacitor bank charging because it eliminates the need for a massive high power flyback transformer. Compared to other voltage multipliers, this charges through fewer diodes in exchange for the requirement of high voltage capacitors. Simulations were performed on the charging circuit that resulted in 86% electrical efficiency with a full charge in under 0.02 s, allowing a 50 Hz pulse rate COTS PPU options are also available in slightly larger volume configurations. As shown in FIGS. 31A and 31B, the on-board electronics 500 are situated in the FPPT 200 with a dedicated microcontroller 505. Commands to the stepper motor 510 to feed propellant, the igniter circuit 515 to fire, and capacitor bank circuit 520 for charging are controlled by the FPPT on-board 500 and not necessarily by the satellite. Sensors 525 may also be employed to monitor temperature in case an emergency shut off is required to allow the system to cool.

Figure 32:
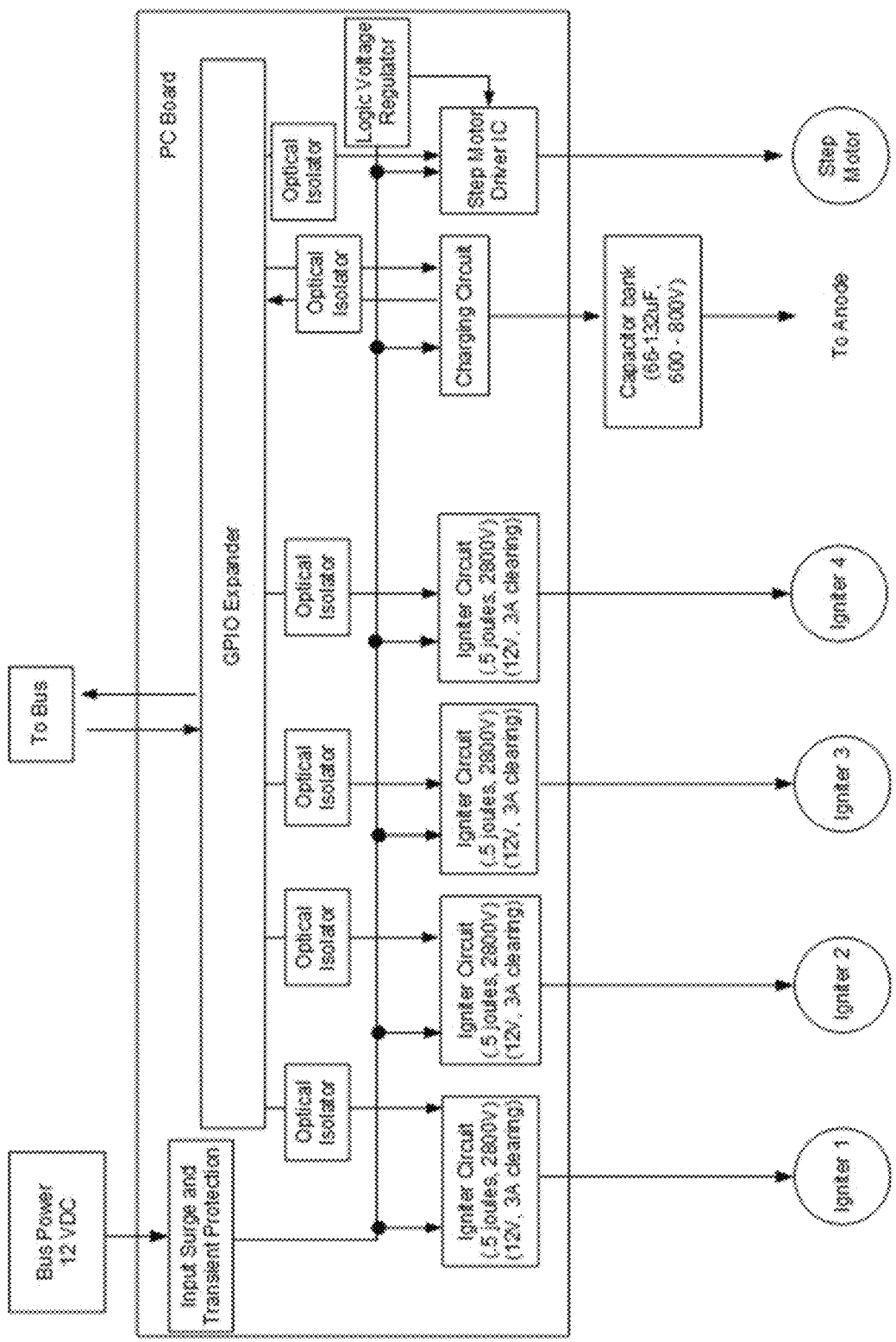
FIG. 32 is a schematic of a more robust unified circuit board design containing electronics for a PPU and motor driver, but without a microprocessor controller.

FIG. 32 shows a schematic of a second possible unified electronics board with PPU and motor driver. This is a more robust circuit design that offloads some control to the bus in exchange for operating without an onboard microcontroller. All operation is controlled with GPIO and some simple counters. This board will utilize a GPIO expander and a simple command list to operate, saving cost, complexity, and software development. COTS PPU options are also available in slightly larger volume configurations. Instead of having the dedicated microcontroller on the FPPT, in this example, the stepper motor and firing operations are controlled through the GPIO to the FPPT.

Thrust Vectoring (Steering) with FPPT Igniters

Figure 33:
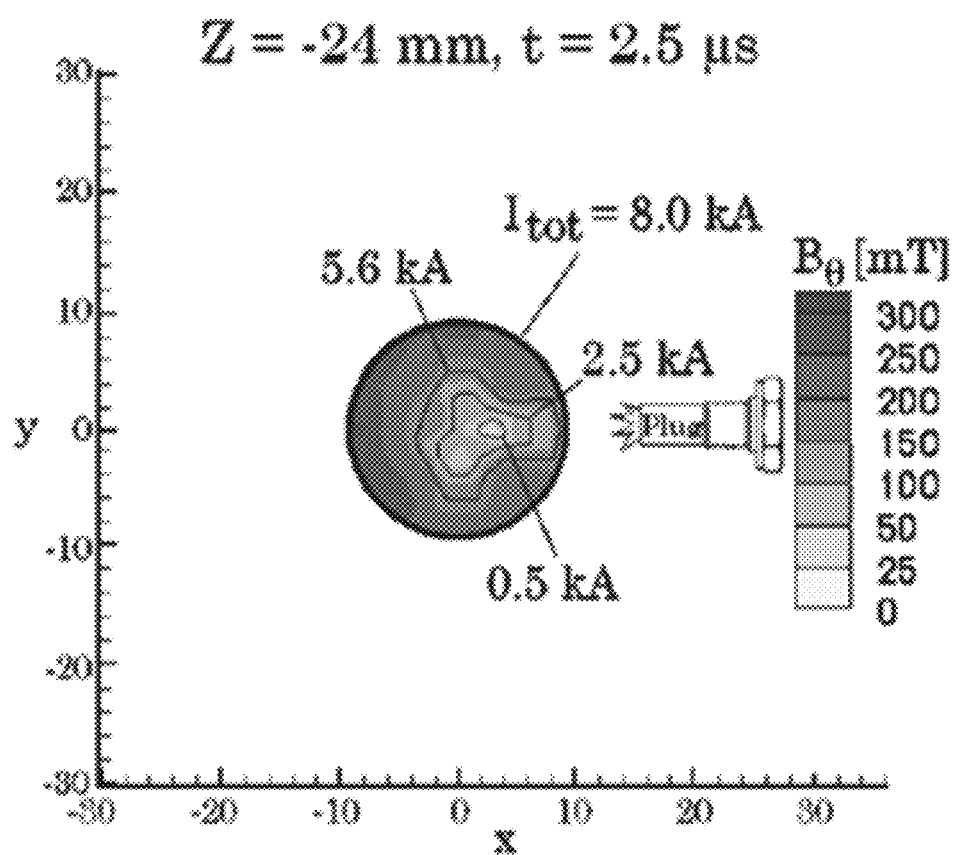
FIG. 33 illustrates B-probe measurements inside the nozzle of the asymmetric discharge produced in a coaxial PPT with side-mounted igniter in terms of magnetic field contour plots and enclosed current (from FIG. 15), implying off-axis electromagnetic thrust.

Achievement of thrust vectoring (and backup ACS) with FPPT takes advantage of the four igniters equally spaced at 0, 90, 180 and 270° around the base of the thruster discharge chamber. In normal operation these igniters are operated sequentially to equalize component life. For thrust vector operation a single igniter is used. The origin of thrust vectoring comes from PPT discharge asymmetry as shown in FIG. 33 for an earlier coaxial PPT design. The distinct asymmetry produces reduced magnetic field $B_\theta$ in the vicinity of the igniter, and maximum $B_\theta$ at 180° from the igniter.

The $B_\theta$ asymmetry will produce a small radial thrust component in addition to the primary axial component. During normal operations the sequential operation of the four igniters will average out this non-axial thrust component. As there is no reliable approach for a calculation, a series of thrust stand tests will be required to quantify FPPT thrust vectoring, that have not been performed to date.

Summary and Future Directions

With these technology advancements, Applicant has now demonstrated the innovative use of a motor-driven system to feed spooled high-density PTFE propellant combined with a cathode design similar to Applicant's prior PPT-11 technology and modern MLCC capacitor electronics packaged into a compact FPPT configuration, FIG. 11; this enables an order of magnitude (or more) improvement in volumetric impulse [N-s/liter] and specific mass for nano-to-small-satellite thruster performance. Using wound solid propellant filament spooled in a 1 U package, the FPPT eliminates fluid leakage and pressurization systems, leading to reduced range safety concerns and significantly reduced recurring costs. Applicant's long-term goal will be to establish the FPPT as a mature integrated system solution.

Experiments have proven stable, reliable operation of a breadboard high-throughput FPPT system. The FPPT thruster is currently at TRL 5. A baseline system has been designed with well-defined operational conditions for power (both losses and requirements), propellant feed rate, and related hardware designs. Hardware designs employed simple machining and manufacturing techniques, allowing Applicant to be able to implement engineering mitigation techniques that have dramatically retired risk of this innovative thruster technology. Future development will jump to TRL 6 and higher. The FPPT thruster system supports the NASA Roadmap for In-Space Propulsion Systems, non-chemical propulsion.

Achievements and risk reduction experiments conducted to date include: (a) Fabricated a PPT thruster head modified for PTFE fiber feed; (b) Demonstrated reliable and accurate metering of the propellant feed; (C) Designed, assembled, and demonstrated reliable highly-parallel ceramic capacitor banks (>500,000 pulses); (D) Demonstrated extended life through bench-testing of six (6) MLCC capacitors to >500,000,000 pulses at 800V, or 80% of rated voltage (1000 V); (E) Designed, assembled, and demonstrated reliable regenerative carbon igniters from COTS materials and components (>500,000 pulses); (F) Demonstrated reliable discharge ignition and evaporation of PTFE fiber in a continuous fashion; (G) Experimentally demonstrated variable specific impulse and thrust in a simulated space environment; (H) Designed a high-throughput 1 U FPPT flight-like system with low specific mass; and (I) Refined system models of discharge pulse and performance from thrust stand results to guide future development.

Future demonstrations and risk reduction to be conducted include: (A) Improved ceramic capacitor bank (higher energy and current, ~40 J and ~30 kA); (B) Performance optimization trade studies (current, feed rate, with thrust stand testing); (C) Flight-like circuit boards (PPU+feed stepper driver); (D) Igniter system development and life testing (>100% life of a 1 U system); (E) Material and geometry optimization (with thrust stand testing); (F) Full system design refinements (maintain goal of α<10 kg/kW); (G) Full system fabrication and integration; (H) Acceptance testing (thrust stand, vibration, TVAC, life); (I) FPPT TRL Increase to TRL 6; and (J) Flight-like FPPT unit delivered to a government agency or customer.

Several factors result in increasing system performance:

Pulse Energy.

Higher pulse energy raises efficiency. A robust 40 J or higher design is desired.

Total Thruster Power Available.

Using an energy storage battery, high power small satellite thruster systems appear possible. We consider a nominal FPPT power level to be 40-80 W at a pulse rate of a few Hertz. This is a power level comparable to the Busek Bit-3 ion thruster.

Pulse Shape.

Pulse shape is controlled through capacitance, inductance, and circuit resistance. The design goal is 30 kA peak current and a several µs pulse half-period.

Capacitor Life.

PPT-11 used a 6.8 kg bank of Unison Industries mica capacitors rated at Vmax=1850 V but only charged to 1300 V. The life of ceramic caps scales inversely as the nth power of charging voltage $[L \sim (Vmax/V)^n]$ where n is typically 10±3. Appropriate voltage ratings for ceramic caps are chosen through testing to ensure a high life cycle safety factor in capacitor operation. The Applicant's MLCC capacitor banks only encountered failure when driven at maximum voltage rating; when operating at ~80% of max voltage, the MLCC capacitor banks operated without issue for >580,000 pulses (~200,000 in compression-connected 175-MLCC circles, the remainder in soldered 320-MLCC square packs). Vishay Intertechnology forecasts in the VJ9363Y104KXGAT datasheet an aging rate of −2.5% capacitance in 10,000 hours. At 3 Hz, this is $1.1 \times 10^8$ pulses.

Pulse Rate and Throttling.

The breadboard FPPT was operated up to 10 pulses per second (pps), but typically ran at 4 pps. By controlling pulse rate, energy per pulse, and propellant feed rate, the 1 U FPPT system is fully throttleable over 0-100% thrust.

ESR.

Equivalent series resistance becomes a limiting factor as the size of the capacitor bank is reduced. An efficient PPT needs to operate at a total impedance of ~10-15 mΩ, so that ESR << 1 mΩ is needed to keep capacitor heating to a few percent of the power input. An ESR of ~1.4 mΩ has been demonstrated.

Peak Current.

Figure 4:
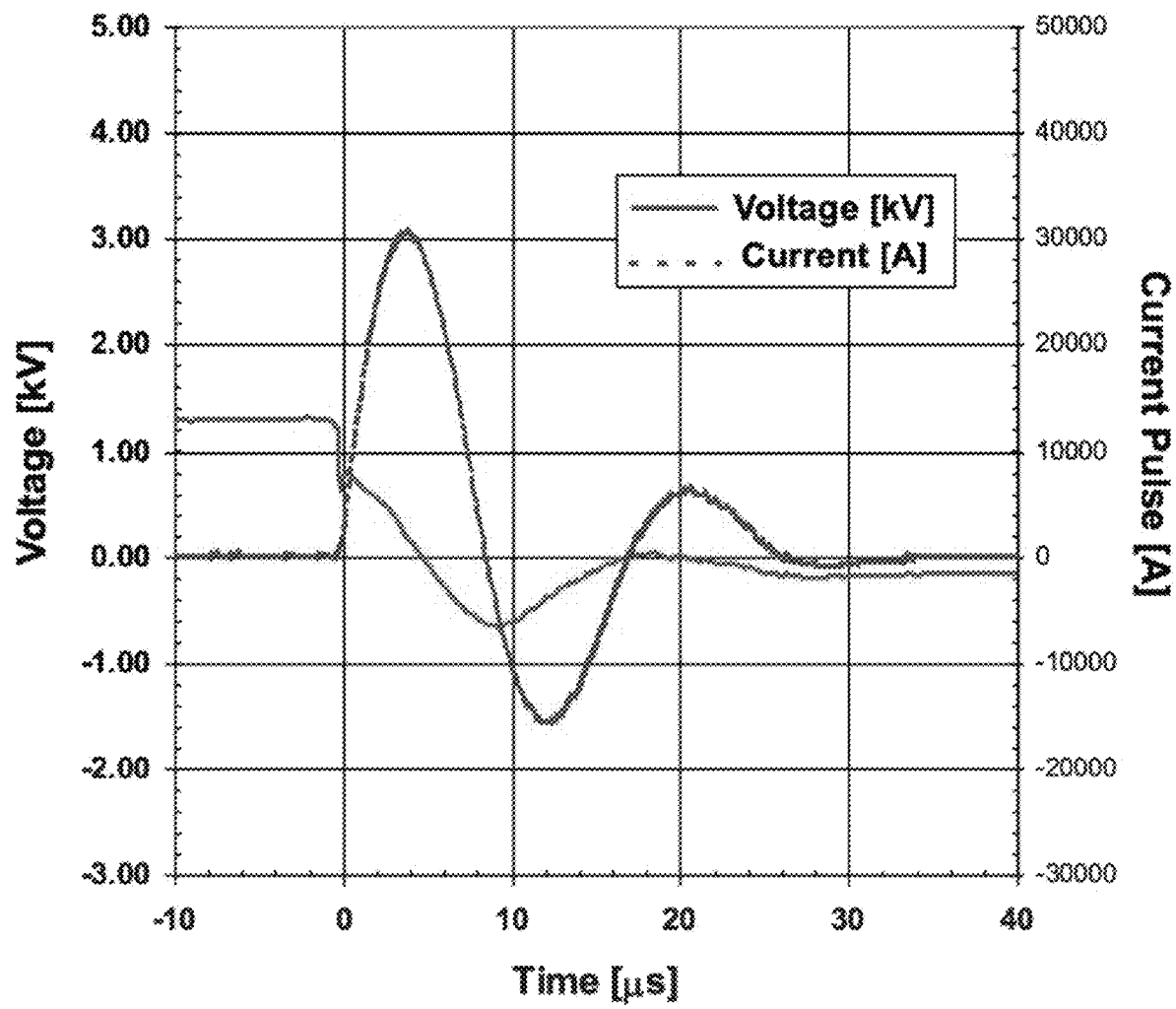
FIG. 4. Typical PPT-11 30 kA current pulse.

PPT-11 peak current was 30 kA, with thrust having both a major electromagnetic and a minor electrothermal component, quantified by β=electromagnetic thrust/total thrust. It has been determined theoretically and experimentally that PPT efficiency increases as β increases. The electromagnetic impulse bit is given by $$I_{bit} = \frac{\mu_o}{4\pi} \int I^2 dt \left[ \ln\left(\frac{r_c}{r_a}\right) + \frac{1}{2} \right]$$

and total thrust is measured on the thrust stand. The pulse current scales as $V/(L/C)^{1/2}$, where L is the circuit inductance and the circuit is impedance-matched to the discharge to minimize ringing (FIG. 4).

Ambient Pressure.

PPT operation requires low pressure in the electrode gap at the time that cap voltage is applied to prevent an unwanted breakdown. Post-pulse sublimation from the propellant face produces a decaying pressure profile, which requires several milliseconds to disperse. This time constant places an upper limit on pulse rate of the order of 100 pps.

Igniters.

The existing regenerative carbon igniter (RCI) design achieved a lifetime of >500,000 pulses. The igniter materials and possible geometry design adjustments can be implemented to achieve a goal of greater than 10 million pulses with a single or multiple igniter. If a single igniter cannot achieve this goal, then multiple igniters can be used in an alternating firing sequence. A >100% life cycle test is desired to reduce risk and clearly demonstrate reliable long-term operation; this corresponds to >10 million pulses with a single FPPT unit. Multiple igniters can also be implemented for redundancy, and to reduce required pulse count per igniter by at least a factor of 2. Testing is used to determine the appropriate path towards developing igniters with the capability of several tens of millions of pulses.

Materials and Geometry Optimization.

Multiple anode materials can be tested to minimize anode erosion without comprising performance. Anode development is critical, because the desired anode has a small diameter, yet must contain the fiber, expose the fiber to the discharge, and be sufficiently robust to tolerate erosion. Feed configurations and materials will continue to be tested for reliability and electrode loss. Two or more different geometries of the cathode cone will be investigated to minimize the volume envelope of the thruster-head and optimize the EM thrust term ($r_c/r_a$) while maintaining (or improving) overall thruster performance. A cylindrical ring cathode can be implemented instead of a cone shape. Careful consideration is being given to the fabrication (manufacturability) of the anode material and cone geometry. To verify comparison and evaluation, thrust stand testing is being performed.

Performance Estimates

Table 1 shows the estimated packaged performance parameters for a typical 1 U FPPT system using different operating modes. The 1 U values are based on current measurements and design. Impulse bits (I-bits) from 0.057-0.241 mN-s have been measured on a thrust stand with a specific impulse (Isp) of 900-2400 s, representing a dramatic enhancement from state-of-art PPT technology. A 1-U (10 cm×10 cm×10 cm, 1 liter) volume FPPT thruster package will provide 2900-7800 N-s total impulse, enabling 0.6-1.6 km/s delta-V for a 5 kg CubeSat. A 1 U design variation with 590 g propellant enables as much as ~10,000 N-s and a delta-V of 2.0 km/s for a 5 kg CubeSat. Increasing the FPPT form factor to 2 U increases propellant mass to 1.4 kg and delta-V to 10.7 km/s for an 8 kg CubeSat. Improved efficiency electronics along with tighter packing would enable higher energy shots with higher efficiency. Optimized impedance matching, propellant diameter, and anode geometry should also enhance efficiency. It may be possible to improve the performance listed in Table 1 by as much as 25-50% with a fully optimized design and system.

TABLE 1

Estimated FPPT performance for a 1 U FPPT system with different operating modes.

| Item | Estimated 1 U FPPT Performance | | | |
|---|---|---|---|---|
| Operating mode | Medium thrust | High thrust | Medium Isp | High Isp |
| Propulsion system volume | 1000 cc | | | |
| Propellant storage volume | 150 cc | | | |
| Propellant | PTFE Teflon | | | |
| Propellant mass (usable) | 331 g | | | |
| Total FPPT wet mass | 1540 g | | | |
| Energy per Pulse from capacitors | 15.2 J | 15.2 J | 15.2 J | 33.3 J |
| Pulse Rate | 2.0 Hz | 7.8 Hz | 2.0 Hz | 2.0 Hz |
| Spacecraft propulsion power input | 36 W | 140 W | 36 W | 79 W |
| Specific Impulse | 900 s | 900 s | 1,500 s | 2,400 s |
| Primary thrust | 0.26 mN | 1.02 mN | 0.20 mN | 0.88 mN |

TABLE 1-continued

Estimated FPPT performance for a 1 U FPPT system with different operating modes.

| Item | Estimated 1 U FPPT Performance | | | |
|---|---|---|---|---|
| Impulse Bit (I-bit) | 0.131 mN-s | 0.131 mN-s | 0.101 mN-s | 0.186 mN-s |
| Mass flow rate of propellant | 0.030 mg/s | 0.116 mg/s | 0.014 mg/s | 0.016 mg/s |
| Total pulses | $2.23 \times 10^7$ | $2.23 \times 10^7$ | $4.81 \times 10^7$ | $4.18 \times 10^7$ |
| Total thrust time | 3,080 hr | 793 hr | 6,640 hr | 5,750 hr |
| Total impulse | 2,920 N-s | 2,920 N-s | 4,870 N-s | 7,790 N-s |
| Volumetric impulse for 1000 cc | 2,920 N-s/liter | 2,920 N-s/liter | 4,870 N-s/liter | 7,790 N-s/liter |
| Spacecraft ΔV, 1 U FPPT, 5 kg s/c | 605 m/s | 605 m/s | 1010 m/s | 1,610 m/s |
| Spacecraft ΔV, 1 U FPPT, 8 kg s/c | 373 m/s | 373 m/s | 622 m/s | 995 m/s |
| Spacecraft ΔV, 1 U FPPT, 15 kg s/c | 197 m/s | 197 m/s | 328 m/s | 525 m/s |

In summary, the present invention provides for a number of different embodiments. In one embodiment there is provided a pulsed plasma thruster. The PPT includes a spool having a fiber propellant wound thereon. A stepper motor in communication with the fiber propellant is provided to pull the fiber propellant from the spool. An insulated tube is configured to have one end in communication with the stepper motor such that the fiber propellant is fed into the insulated tube. An anode is provided with a bore therethrough and it has one end in communication with the insulated tube, such that the fiber propellant travels through the anode. The anode has an exit end, opposite the insulated tube, where the fiber propellant fed through the anode exits. The PPT further includes a power processing unit electrically connected in parallel to a capacitor bank. The capacitor bank has a positive electrical connection to the anode and a negative electrical connection to a cathode. The capacitor bank is further configured to lower an equivalent series resistance that raises a pulse current and raises a $\vec{j} \times \vec{B}$ thrust that is generated by the pulsed plasma thruster. The PPT further includes a coaxial insulator positioned about the exit end of the anode. The cathode is positioned about the insulator and has an interior profile shaped into a nozzle region. The PPT has an igniter fitted through an opening in the cathode, wherein when the igniter is pulsed, the igniter is configured to expel electrons toward the anode region to ignite a primary high current, high magnetic field discharge between the anode and cathode thereby creating a plasma that vaporizes the fiber propellant at the exit end. And wherein the vaporizing fiber propellant combines with the high current discharge to create a partially ionized gas electromagnetically and electrothermally accelerated outward from the nozzle region to produce the $\vec{j} \times \vec{B}$ thrust. In addition, as the fiber propellant vaporizes, the stepper motor feeds more fiber propellant from the spool to the exit end.

In other embodiments, the capacitor bank may include a plurality of low mass multi-layer ceramic capacitors formed in a parallel configuration to increase capacitance while maintaining low equivalent series resistance.

The PPT may also utilize a plurality of low mass multi-layer ceramic capacitors mounted in a parallel configuration to a plate that is electrically connected to the anode. In addition, the plate may have a centered aperture sized to receive and mount the anode. In yet other embodiments, the plate may be circular, and the plurality of ceramic capacitors are arranged in concentric rings around the centered aperture; or alternatively, the plate may be a quadrilateral shape, and the plurality of ceramic capacitors are arranged around the centered aperture.

It is also possible to mount the plurality of ceramic capacitors on both sides of the plate. Conversely, the plurality of ceramic capacitors may be mounted on both sides of multiple plates.

In this embodiment the propellant fiber is made of polytetrafluoroethylene (Teflon).

In other embodiments, the PPT could include more than one igniter. Each igniter being fitted through a corresponding opening in the cathode. The igniters could then be operated preferably sequentially.

In another embodiment, there is provided a PPT that includes a fiber propellant feed system. The fiber propellant feed system includes a motor configured to pull a fiber propellant from a spool and feed the fiber propellant into a centrally located anode and towards an exit end defined at an end of the anode. The PPT include a capacitor bank having a back plate electrically connected to the anode. The capacitor bank has a plurality of low mass multi-layer ceramic capacitors formed in a parallel configuration. The back plate would further include an opening to receive the anode. A cathode is insulated from the anode and is connected to the capacitor bank. One or more igniters is provided and fitted through a corresponding opening in the cathode. When the one or more igniters are triggered, each igniter is configured to expel electrons toward the anode region to ignite a primary high energy discharge between the anode and cathode thereby creating a plasma that vaporizes the fiber propellant at the exit end, and wherein the vaporizing fiber propellant combines with the high current discharge to create a partially ionized gas electromagnetically and electrothermally accelerated outward from the discharge to produce a $\vec{j} \times \vec{B}$ thrust, and wherein as the fiber propellant vaporizes, the motor feeds more fiber propellant from the spool to the exit end.

The PPT of this embodiment may further include a power processing unit electrically connecting the capacitor bank to the anode and cathode. In addition, the capacitor bank may be further configured to lower an equivalent series resistance to cause an increase in a discharge current and an increase in the $\vec{j} \times \vec{B}$ thrust. In yet other aspects of this embodiment, an insulated tube can be configured between the motor and the anode and further configured to communicate the fiber propellant from the motor to the anode. In addition, the cathode is secured to an insulator positioned about an exit end of the anode.

The capacitor bank in this embodiment may be configured in a circular shape such that the plurality of low mass multi-layer ceramic capacitors is configured in concentric rings around a centered aperture sized to receive the centrally located anode.

As noted herein, the present invention is also directed to a uniquely created capacitor bank module capable of being configured for various uses and used in connection with other capacitor bank modules. In one embodiment there is provided a capacitor bank module that has (a) an anode-bank plate and a first cathode-bank plate; (b) a first plurality of multi-layer ceramic capacitors mounted to a front side on the anode-bank plate and connected to each other in a parallel configuration, and wherein the front side faces the first cathode-bank plate; (c) an opening defined through both the anode-bank plate and the first cathode-bank plate; and (d) an anode positioned through the openings in both the anode-bank plate and the first cathode-bank plate, wherein the anode is electrically connected to the anode-bank plate and insulated from the first cathode-bank plate by an insulator, and wherein the anode has a predetermined length such that a portion of the anode extends from the first cathode-bank plate.

The capacitor bank module may have the insulator fitted in the opening of the cathode-bank plate such that the anode is prevented from charging the first cathode-bank plate. In addition, the anode may be further configured to have a bore there-through to receive and expel a propellant. In various configurations, the anode-bank plate may be circular, and the plurality of ceramic capacitors are stacked in concentric rings around the opening in the center of the anode-bank plate. Alternatively, the anode-bank plate may be a quadrilateral shape, and the plurality of ceramic capacitors are stacked around the opening in the anode-bank plate.

The capacitor bank module may also include a second cathode-bank plate being positioned to sandwich the anode-bank plate between the second cathode-bank plate and the first cathode-bank plate, and the second cathode-bank plate having an opening. In this configuration a second insulator is positioned in the opening of the second cathode-bank to insulate the second cathode-bank plate when the anode is positioned through the opening of the second cathode-bank plate. A second plurality of multi-layer ceramic capacitors would then mounted to a back side on the anode-bank plate that, and wherein the back side faces the second cathode-bank plate.

As noted, a second capacitor bank module may be similarly configured and be connected in a parallel configuration to a first capacitor bank module. In this configuration, an anode extension is positioned between the first and second capacitor bank modules to electrically connect the capacitor bank modules to each other.

In yet another embodiment of the present invention, a PPT circuit can be provided. The PPT circuit can be configured as a dedicated microprocessor on the pulsed plasma thruster. The microprocessor having programming instructions to control the following: (a) a motor to feed fiber propellant from a spool into a centrality located anode towards an exit end defined at an end of the anode; (b) a capacitor bank having a plate electrically connected to the anode, the capacitor bank having a plurality of low mass and low volume multi-layer ceramic capacitors formed in a parallel configuration, and wherein the plate includes an opening to receive the anode; and (c) one or more igniters, each igniter fitted through a corresponding opening in a cathode insulated from the anode and connected to the capacitor bank, wherein when the one or more igniters are triggered, each igniter is configured to expel electrons towards the anode region to ignite a primary high current discharge between the anode and cathode thereby creating a plasma that vaporizes the fiber propellant at the exit end, and wherein the vaporizing fiber propellant combines with the high current discharge to create a partially ionized gas electromagnetically and electrothermally accelerated outward from the discharge to produce a $\vec{j}\times\vec{B}$ thrust, and wherein as the fiber propellant vaporizes, the dedicated microprocessor further controls the feed of more fiber propellant from the spool to the exit end such that a conical end tip is formed on the end of the fiber propellant exposed in the cathode, and wherein the conical end tip being shaped by sublimation caused by the primary high current discharge, and wherein a height of the conical end tip is a function of a rate the propellant is fed to the exit end and the energy of the high current discharge.

In yet other aspects of the invention, various embodiments are outlined to a coaxial carbon igniter that can be used with a pulsed plasma thruster. The igniter would have a stainless-steel center electrode or other common electrode material, a ceramic insulator surrounding the stainless-steel center electrode, and an electrically conducting sleeve surrounding the ceramic insulator. The stainless-steel center electrode lacks a semiconductor layer over the insulator since during operation with a carbon-containing propellant or fuel, firing the igniter produces a carbon layer over the insulator thereby being configured to regenerate for subsequent firing.

As provided herein, there is also various methods utilized to create a pulsed plasma thruster. One particular method involves the steps of providing a centered cylindrical anode electrically connected to a capacitor bank; connecting a cathode to a capacitor bank; feeding a fiber propellant by a controlled motor from a spool through the centered cylindrical anode to an entrance opening in the cathode; providing a plurality of low mass ceramic capacitors formed in a parallel configuration to define the capacitor bank, and electrically connecting the capacitor bank to the anode and to the cathode and to the power processing unit, and further configuring the capacitor back with an opening such that the centered cylindrical anode is received through the capacitor bank; producing thrust by expelling electrons into the cathode towards the anode to ignite a primary high current, high magnetic field discharge between the anode and the cathode creating a plasma vaporizing the fiber propellant at the entrance opening such that the vaporizing fiber propellant combines with the high current discharge to create a partially ionized gas electromagnetically and electrothermally accelerated outward from the primary high energy discharge; controlling the motor to feed fiber propellant from the spool as the fiber propellant vaporizes such that the control of the fiber propellant continuously forms a conical end tip on an end of the fiber propellant protruding from the tubular anode and exposed inside the cathode region, and wherein the conical end tip being shaped by sublimation caused by the primary high current discharge, and wherein a length of the conical end tip being a function of a rate the propellant is fed to the exit end.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A pulsed plasma thruster comprising: a spool having a fiber propellant wound thereon; a stepper motor in communication with the fiber propellant to pull the fiber propellant from the spool; an insulated tube configured to have one end of the insulated tube in communication with the stepper motor such that the fiber propellant is fed into the insulated tube; an anode bored through and having one end of the anode in communication with the insulated tube, such that the fiber propellant travels through the anode, the anode having an exit end, wherein the fiber propellant fed through the anode exits at the exit end; a power processing unit electrically connected in parallel to a capacitor bank, the capacitor bank having a positive electrical connection to the anode and the capacitor bank having a negative electrical connection to a cathode, and wherein the capacitor bank is configured to lower an equivalent series resistance raising a pulse current and raising a {right arrow over (j)}.times.{right arrow over (B)} thrust generated by the pulsed plasma thruster; a coaxial insulator positioned about the exit end of the anode; the cathode further positioned about the insulator and having an interior profile shaped into a nozzle region; and an igniter fitted through an opening in the cathode, wherein when the igniter is pulsed, the igniter is configured to expel electrons toward the anode to ignite a primary high current, high magnetic field discharge between the anode and cathode thereby creating a plasma that vaporizes the fiber propellant at the exit end, and wherein fiber propellant that has been vaporized combines with the primary high current high magnetic field discharge to create a partially ionized gas electromagnetically and electrothermally accelerated outward from the nozzle region to produce the {right arrow over (j)}.times.{right arrow over (B)} thrust, and wherein as the fiber propellant vaporizes, the stepper motor feeds more fiber propellant from the spool to the exit end.

2. The pulsed plasma thruster of claim 1, wherein the capacitor bank includes a plurality of low mass multi-layer ceramic capacitors formed in a parallel configuration to increase capacitance while maintaining low equivalent series resistance.

3. The pulsed plasma thruster of claim 2, wherein the plurality of low mass multi-layer ceramic capacitors is mounted in the parallel configuration to a plate that is electrically connected to the anode.

4. The pulsed plasma thruster of claim 3, wherein the plate has a centered aperture sized to receive and mount to the anode.

5. The pulsed plasma thruster of claim 4, wherein the plate is circular, and the plurality of ceramic capacitors are arranged in concentric rings around the centered aperture.

6. The pulsed plasma thruster of claim 4, wherein the plate has a quadrilateral shape, and the plurality of ceramic capacitors are arranged around the centered aperture.

7. The pulsed plasma thruster of claim 3, wherein the plurality of ceramic capacitors is mounted on both sides of the plate.

8. The pulsed plasma thruster of claim 3, wherein the plate comprises multiple plates, and wherein the plurality of ceramic capacitors is mounted on both sides of the multiple plates.

9. The pulsed plasma thruster of claim 1, wherein the fiber propellant is made of polytetrafluoroethylene.

10. The pulsed plasma thruster of claim 1, further comprising at least one additional igniter so as to comprise a plurality of igniters, each igniter of the at least one additional igniter being fitted through a corresponding opening in the cathode.

11. The pulsed plasma thruster of claim 10, wherein the plurality of igniters are operated sequentially.

12. A pulsed plasma thruster comprising: a fiber propellant feed system including a motor configured to pull a fiber propellant from a spool and feed the fiber propellant into a centrally located anode and towards an exit end defined at an end of the centrally located anode; a capacitor bank having a back plate electrically connected to the centrally located anode, the capacitor bank having a plurality of low mass multi-layer ceramic capacitors formed in a parallel configuration, and wherein the back plate includes an opening to receive the centrally located anode; a cathode insulated from the anode and being connected to the capacitor bank; and one or more igniters, each igniter of the one or more igniters being fitted through a corresponding opening in the cathode, wherein when the one or more igniters are triggered, each igniter is configured to expel electrons toward the centrally located anode to ignite a primary high energy discharge between the centrally located anode and cathode thereby creating a plasma that vaporizes the fiber propellant at the exit end, and wherein fiber propellant that has been vaporized combines with the primary high energy discharge to create a partially ionized gas electromagnetically and electrothermally accelerated outward from the primary high energy discharge to produce a {right arrow over (j)}.times.{right arrow over (B)} thrust, and wherein as the fiber propellant vaporizes, the motor feeds more fiber propellant from the spool to the exit end.

13. The pulsed plasma thruster of claim 12 further comprising a power processing unit electrically connecting the capacitor bank to the centrally located anode and cathode.

14. The pulsed plasma thruster of claim 13, wherein the capacitor bank is further configured to lower an equivalent series resistance to cause an increase in a current of the primary high energy discharge and an increase in the {right arrow over (j)}.times.{right arrow over (B)} thrust.

15. The pulsed plasma thruster of claim 12, wherein the fiber propellant is made of polytetrafluoroethylene.

16. The pulsed plasma thruster of claim 12 further comprising: an insulated tube configured between the motor and the centrally located anode and further configured to communicate the fiber propellant from the motor to the centrally located anode.

17. The pulsed plasma thruster of claim 12, wherein the cathode is secured to an insulator positioned about the exit end of the anode.

18. The pulsed plasma thruster of claim 12, wherein the one or more igniters are operated sequentially.

19. The pulsed plasma thruster of claim 14, wherein the capacitor bank has a circular shape such that the plurality of low mass multi-layer ceramic capacitors is configured in concentric rings around a centered aperture sized to receive the centrally located anode.

20. A pulsed plasma thruster circuit comprising: a dedicated microprocessor on the pulsed plasma thruster, the microprocessor having programming instructions to control the following: (a) a motor to feed fiber propellant from a spool into a centrally located anode towards an exit end defined at an end of the centrally located anode; (b) a capacitor bank having a plate electrically connected to the centrally located anode, the capacitor bank having a plurality of low mass and low volume multi-layer ceramic capacitors formed in a parallel configuration, and wherein the plate includes an opening to receive the centrally located anode;

and (c) one or more igniters, each igniter of the one or more igniters fitted through a corresponding opening in a cathode insulated from the centrally located anode and connected to the capacitor bank, wherein when the one or more igniters are triggered, each igniter of the one or more igniters is configured to expel electrons towards the centrally located anode to ignite a primary high current discharge between the centrally located anode and cathode thereby creating a plasma that vaporizes the fiber propellant at the exit end, and wherein fiber propellant that has been vaporized combines with the primary high current discharge to create a partially ionized gas electromagnetically and electrothermally accelerated outward from the primary high current discharge to produce a $\vec{j}\times\vec{B}$ thrust, and wherein as the fiber propellant vaporizes, the dedicated microprocessor further controls the feed of more fiber propellant from the spool to the exit end such that a conical end tip is formed on an end of the fiber propellant exposed in the cathode, and wherein the conical end tip being shaped by sublimation caused by the primary high current discharge, and wherein a height of the conical end tip is a function of a rate the fiber propellant is fed to the exit end and an energy of the primary high current discharge.

21. A coaxial carbon igniter system comprising: a pulsed plasma thruster comprising: a fiber propellant feed system including a motor configured to pull a fiber propellant from a spool and feed the fiber propellant into a centrally located anode and towards an exit end defined at an end of the centrally located anode, wherein the fiber propellant comprises a carbon containing compound; a capacitor bank having a plate electrically connected to the centrally located anode, the capacitor bank having a plurality of low mass low volume multi-layer ceramic capacitors formed in a parallel configuration, and wherein the plate includes an opening to receive the centrally located anode; a cathode insulated from the centrally located anode and being connected to the capacitor bank; one or more coaxial regenerative carbon igniters, each igniter of the one or more coaxial regenerative carbon igniters being fitted through a corresponding opening in the cathode, wherein when the one or more coaxial regenerative carbon igniters is triggered, each igniter of the one or more coaxial regenerative carbon igniters is configured to expel electrons toward the centrally located anode to ignite a primary high current discharge between the centrally located anode and the cathode thereby creating a plasma that vaporizes the fiber propellant at the exit end, and wherein fiber propellant that has been vaporized combines with the primary high current discharge to create a partially ionized gas electromagnetically and electrothermally accelerated outward from the primary high current discharge to produce a $\vec{j}\times\vec{B}$ thrust, and wherein as the fiber propellant vaporizes, the motor feeds more fiber propellant from the spool to the exit end; and wherein each igniter of the one or more coaxial regenerative carbon igniters includes: a conductive center electrode, a ceramic insulator surrounding the conductive center electrode, and an electrically conducting sleeve surrounding the ceramic insulator, and wherein the conductive center electrode lacks a semiconductor layer over the insulator since during operation the fiber propellant ablates during firing to produce a carbon layer over the insulator, each igniter of the one or more coaxial regenerative carbon igniters thereby being configured to regenerate for subsequent firing.

22. A pulsed plasma thruster comprising: a fiber propellant feed system including a motor configured to pull a fiber propellant from a spool and feed the fiber propellant into a bore defined through a centrally positioned anode and further towards an exit end defined at an end of the anode; a capacitor bank electrically connected to the anode, and wherein the capacitor bank is configured to lower an equivalent series resistance increasing a pulse current and increasing a $\vec{j}\times\vec{B}$ thrust generated by the pulsed plasma thruster; a cathode insulated from the centrally positioned anode and being connected to the capacitor bank; a power processing unit electrically connected in parallel to the capacitor bank; one or more igniters, each igniter of the one or more igniters fitted through a corresponding opening in the cathode, wherein when the one or more igniters is triggered, the each igniter of the one or more igniters is configured to expel electrons toward the centrally positioned anode, to thereby ignite a primary high current discharge between the centrally positioned anode and cathode thereby creating a plasma that vaporizes the fiber propellant at the exit end, and wherein fiber propellant that has been vaporized combines with the primary high current discharge to create a partially ionized gas electromagnetically and electrothermally accelerated outward from a region of the primary high current discharge to produce the $\vec{j}\times\vec{B}$ thrust, and wherein as the fiber propellant vaporizes, the motor feeds more fiber propellant from the spool to the exit end, wherein the capacitor bank is defined to include: an anode-bank plate and a first cathode-bank plate; a first plurality of ceramic capacitors mounted to a side on the anode-bank plate and connected to each other in a parallel configuration, and wherein the side faces the first cathode-bank plate; an opening defined through centers of both the anode-bank plate and the first cathode-bank plate; and wherein the centrally positioned anode is positioned through the openings in both the anode-bank plate and the first cathode-bank plate, and wherein the centrally positioned anode is electrically connected to the anode-bank plate and insulated from the first cathode-bank plate by an insulator, and wherein the centrally positioned anode has a predetermined length such that the exit end of the centrally positioned anode extends from the first cathode-bank plate.

23. The pulsed plasma thruster of claim 22, wherein the anode-bank plate is circular, and the first plurality of ceramic capacitors are stacked in concentric rings around the opening in the anode-bank plate.

24. The pulsed plasma thruster of claim 22, wherein the anode-bank plate is a quadrilateral shape and the first plurality of ceramic capacitors are stacked around the opening in the anode-bank plate.

25. A method of creating a pulsed plasma thruster comprising the steps of: providing a centered cylindrical anode electrically connected to a capacitor bank; connecting a cathode to a capacitor bank; feeding a fiber propellant by a controlled motor from a spool through the centered cylindrical anode to an entrance opening in the cathode; providing a plurality of low mass ceramic capacitors formed in a parallel configuration to define the capacitor bank, and electrically connecting the capacitor bank to the centered cylindrical anode and to the cathode and to the power processing unit, and further configuring the capacitor bank with an opening such that the centered cylindrical anode is received through the capacitor bank; producing thrust by expelling electrons into the cathode towards the centered cylindrical anode to ignite a primary high current and high magnetic field discharge between the centered cylindrical anode and the cathode creating a plasma vaporizing the fiber propellant at the entrance opening such that fiber propellant which has been vaporized combines with the primary high current and high magnetic field discharge to create a partially ionized gas electromagnetically and electrothermally accelerated outward from the primary high current and high magnetic field discharge; and controlling the controlled motor to feed fiber propellant from the spool as the fiber propellant vaporizes such that the control of the fiber propellant continuously forms a conical end tip on an end of the fiber propellant protruding from the centered cylindrical anode and exposed within the cathode, and wherein the conical end tip is shaped by sublimation caused by the primary high current discharge, and wherein a length of the conical end tip is a function of a rate the propellant is fed to the exit end.

26. The method of claim 25 further comprising: operating the capacitor bank at a de-rated voltage.

* * * * *